(12) United States Patent
Kitabatake et al.

(10) Patent No.: US 10,995,649 B2
(45) Date of Patent: May 4, 2021

(54) VEHICLE ENGINE

(71) Applicant: MAZDA MOTOR CORPORATION, Hiroshima (JP)

(72) Inventors: Keishi Kitabatake, Hiroshima (JP);
Taku Kuramashi, Hatsukaichi (JP);
Tamotsu Takamure, Hiroshima (JP);
Takeshi Nakahira, Hiroshima (JP);
Yuji Kojima, Hiroshima (JP); Amane Tsuda, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 25 days.

(21) Appl. No.: 16/088,399

(22) PCT Filed: Jul. 27, 2017

(86) PCT No.: PCT/JP2017/027266
§ 371 (c)(1),
(2) Date: Sep. 25, 2018

(87) PCT Pub. No.: WO2018/021482
PCT Pub. Date: Feb. 1, 2018

(65) Prior Publication Data
US 2020/0003104 A1   Jan. 2, 2020

(30) Foreign Application Priority Data

Jul. 27, 2016 (JP) .............................. JP2016-147106

(51) Int. Cl.
*F01N 13/10* (2010.01)
*F02M 26/06* (2016.01)
(Continued)

(52) U.S. Cl.
CPC ................ *F01N 13/10* (2013.01); *B60K 5/04* (2013.01); *B60K 13/04* (2013.01); *B62D 25/14* (2013.01);
(Continued)

(58) Field of Classification Search
CPC . F01N 13/10; F01N 13/08; F01N 3/10; F01N 2340/02; B62D 25/2009;
(Continued)

(56) References Cited

U.S. PATENT DOCUMENTS 5,046,578 A * 9/1991 Nakayama ............... B60K 5/00
123/195 AC
6,722,126 B2 * 4/2004 Kawamizu ............ F01N 3/2892
60/324
(Continued)

FOREIGN PATENT DOCUMENTS

DE   20 2011 104 961 U1   10/2011
EP            1422412 A2 *  5/2004  ............. F02M 26/12
(Continued)

OTHER PUBLICATIONS

International Search Report issued in PCT/JP2017/027266; dated Aug. 29, 2017.
(Continued)

*Primary Examiner* — Darlene P Condra
(74) *Attorney, Agent, or Firm* — Studebaker & Brackett PC

(57) ABSTRACT

A vehicle engine 2 comprises an exhaust system having an exhaust manifold 12 and an exhaust purification device 18. The exhaust manifold 12 is disposed at a predetermined distance from a dash panel 106 constituting a body of the vehicle 100, the exhaust purification device 18 is disposed in a position overlapping a floor tunnel region 114, formed by a floor tunnel of the body, and is disposed below the exhaust (Continued)

manifold 12 and to one side of the center of the engine 2 in the cylinder-array direction, as viewed from the longitudinal direction of the vehicle 100. An exhaust purification device introduction passage 17 connecting the exhaust manifold 12 and the exhaust purification device 18 is disposed on the other side of the center of the exhaust manifold 12 in the cylinder-array direction, and extends below the exhaust manifold 12 to be connected to the exhaust purification device 18.

9 Claims, 11 Drawing Sheets

(51) Int. Cl.
F02M 26/12 (2016.01)
F02M 26/15 (2016.01)
F02M 26/24 (2016.01)
F02M 26/28 (2016.01)
B60K 5/04 (2006.01)
B60K 13/04 (2006.01)
B62D 25/14 (2006.01)
B62D 25/20 (2006.01)
F01N 3/10 (2006.01)
F02M 26/21 (2016.01)
F02M 26/27 (2016.01)
F02M 26/50 (2016.01)
F01N 13/08 (2010.01)
F01N 3/033 (2006.01)
F02B 37/00 (2006.01)
F02B 39/02 (2006.01)
F02B 39/04 (2006.01)
F02B 39/10 (2006.01)
F02D 23/00 (2006.01)

(52) U.S. Cl.
CPC ......... *B62D 25/2009* (2013.01); *F01N 3/033* (2013.01); *F01N 3/10* (2013.01); *F01N 13/08* (2013.01); *F02B 37/00* (2013.01); *F02B 39/02* (2013.01); *F02B 39/04* (2013.01); *F02B 39/10* (2013.01); *F02D 23/00* (2013.01); *F02M 26/06* (2016.02); *F02M 26/12* (2016.02); *F02M 26/15* (2016.02); *F02M 26/21* (2016.02); *F02M 26/24* (2016.02); *F02M 26/27* (2016.02); *F02M 26/28* (2016.02); *F02M 26/50* (2016.02); *B60Y 2306/01* (2013.01)

(58) Field of Classification Search
CPC ................ B62D 25/14; B60Y 2306/01; Y02A 50/2322; Y02T 10/144; F02M 26/23; F02M 26/11; F02M 26/50; F02M 26/27; F02M 26/21; F02M 26/28; F02M 26/24; F02M 26/15; F02M 26/12; F02M 26/06; F02B 67/10; F02B 37/14; F02B 37/04; F02B 33/34; F02B 1/12; F02B 39/10; F02B 39/04; B60K 5/06; B60K 13/04; B60K 5/04; F02D 23/00
See application file for complete search history.

(56) References Cited

U.S. PATENT DOCUMENTS

| | | | | |
|---|---|---|---|---|
| 7,559,196 | B2* | 7/2009 | Inoue | F01N 3/08 60/288 |
| 9,255,517 | B2* | 2/2016 | Nishimura | F01N 13/1805 |
| 2003/0131594 | A1 | 7/2003 | Kawamizu | |
| 2004/0007411 | A1 | 1/2004 | Arai et al. | |
| 2007/0107704 | A1 | 5/2007 | Billings et al. | |
| 2007/0283690 | A1* | 12/2007 | Miller | B60R 21/09 60/547.1 |
| 2008/0216783 | A1* | 9/2008 | Ando | F01L 1/022 123/90.17 |
| 2008/0251306 | A1 | 10/2008 | Kobayashi et al. | |
| 2010/0242901 | A1 | 9/2010 | Seto et al. | |
| 2011/0126522 | A1 | 6/2011 | Ushijima et al. | |
| 2013/0125544 | A1 | 5/2013 | Mond et al. | |
| 2017/0015326 | A1* | 1/2017 | Iwata | F02D 31/001 |
| 2019/0048779 | A1* | 2/2019 | Hoshino | F01N 11/005 |

FOREIGN PATENT DOCUMENTS

| | | |
|---|---|---|
| FR | 2 886 671 A1 | 12/2006 |
| FR | 2949140 A1 | 2/2011 |
| JP | H05-280359 A | 10/1993 |
| JP | 2003-206783 A | 7/2003 |
| JP | 2004-044668 A | 2/2004 |
| JP | 2004-176554 A | 6/2004 |
| JP | 2004176688 A | 6/2004 |
| JP | 2007-146681 A | 6/2007 |
| JP | 2008180173 A | 8/2008 |
| JP | 2008-260472 A | 10/2008 |
| JP | 2011-214450 A | 10/2011 |
| JP | 2012-031782 A | 2/2012 |
| JP | 2012-057519 A | 3/2012 |
| JP | 2013-241849 A | 12/2013 |
| JP | 2015021440 A | 2/2015 |
| JP | 2015-059559 A | 3/2015 |
| JP | 2015-124692 A | 7/2015 |
| JP | 2015218588 A | 12/2015 |
| JP | 2016003614 A | 1/2016 |
| JP | 2016-113931 A | 6/2016 |

OTHER PUBLICATIONS

An Office Action mailed by the Japanese Patent Office dated Nov. 11, 2019, which corresponds to Japanese Patent Application No. 2018-530393 and is related to U.S. Appl. No. 16/088,399; with English language translation.
An Office Action mailed by the Japanese Patent Office dated Jul. 29, 2019, which corresponds to Japanese Patent Application No. 2018-530391 and is related to U.S. Appl. No. 16/088,399; with English language translation.
An Office Action mailed by the Japanese Patent Office dated Jul. 1, 2019, which corresponds to Japanese Patent Application No. 2018-530393 and is related to U.S. Appl. No. 16/088,399; with English translation.
Written Opinion of the International Searching Authority issued in PCT/JP2017/027266; dated Aug. 29, 2017.
The extended European search report issued by the European Patent Office dated Jan. 30, 2019, which corresponds to European Patent Application No. 17834484.2-1004 and is related to U.S. Appl. No. 16/088,399.
The extended European search report issued by the European Patent Office dated Feb. 22, 2019, which corresponds to European Patent Application No. 17834483.4-1004 and is related to U.S. Appl. No. 16/088,399.
Communication pursuant to Article 94(3) EPC issued by the European Patent Office dated Mar. 10, 2020 and received from a European associate on Jun. 19, 2020, which corresponds to European Patent Application No. 17834483.4-1004 and is related to U.S. Appl. No. 16/088,399.
Communication pursuant to Article 94(3) EPC issued by the European Patent Office dated Jan. 28, 2020, which corresponds to European Patent Application No. 17 834 485.9-1004 and is related to U.S. Appl. No. 16/088,399.
An Office Action mailed by the Japanese Patent Office dated Apr. 6, 2020, which corresponds to Japanese Patent Application No. 2018-530392 with English Translation.

* cited by examiner

VEHICLE ENGINE

TECHNICAL FIELD

The present invention relates to a vehicle engine, and more specifically relates to a vehicle engine comprising an exhaust system having an exhaust manifold and an exhaust purification device.

BACKGROUND ART

The exhaust purification catalyst has an appropriate activation temperature range and exerts purification performance by allowing passage of an exhaust gas with a temperature within the activation temperature range. Although the activation temperature range for the catalyst needs to be set in accordance with a specification of a vehicle, when a temperature range for a possible exhaust gas is wide, for example as in the case of an engine using both a compression ignition operation and a spark ignition operation, it may be difficult to set an activation temperature range corresponding to the temperature range for the exhaust gas, and it may be difficult to purify the exhaust gas with the exhaust purification catalysis in every temperature range.

For solving such a problem, it is conceivable that, for example, the upper limit of the activation temperature range is set in association with the highest exhaust gas temperature expected for the engine, and as for processing on an exhaust gas on the lowest exhaust gas temperature side, the exhaust purification system is disposed as close to the engine as possible. An example of the placement of the exhaust purification system located close to the engine described in Patent Document 1. When the exhaust purification system is disposed close to the engine as thus described, the exhaust gas can pass through the exhaust purification catalysis before the temperature of the exhaust gas decreases, so that the exhaust gas can be purified even when the temperature of the exhaust gas is relatively low.

CITATION LIST

Patent Document

Patent Document 1: Japanese Patent Laid-Open No. 2012-57519

SUMMARY OF INVENTION

Technical Problem

When the exhaust purification system is disposed close to the engine as described above, a larger number of parts including the exhaust purification catalyst are disposed in an engine room. Hence it is necessary to minimize damage caused by the exhaust purification system to the other parts at the time of collision of the vehicle even if the engine moves rearwardly due to the collision.

An object of the present invention is to provide a vehicle engine capable of ensuring collision safety while disposing an exhaust purification system close to the engine.

Solution to Problem

For achieving the above object, a vehicle engine of the present invention is a vehicle engine comprising an exhaust system device having an exhaust manifold and an exhaust purification device, the vehicle engine being placed horizontally such that a cylinder-array direction coincides with a vehicle-width direction, wherein the exhaust manifold is disposed at a predetermined distance from a dash panel constituting a body of the vehicle, the exhaust purification device is disposed in a position overlapping a floor tunnel region, formed by a floor tunnel of the body, and is disposed below the exhaust manifold and to one side of the center of the engine in a cylinder-array direction, as viewed from the longitudinal direction of the vehicle, and a connection passage connecting the exhaust manifold and the exhaust purification device is disposed on the other side of the center of the exhaust manifold in the cylinder-array direction, and extends below the exhaust manifold to be connected to the exhaust purification device.

According to the present invention as thus configured, the exhaust manifold is disposed at a predetermined distance from the dash panel, and the exhaust purification device is disposed below the exhaust manifold, therefore, the exhaust purification device of the engine is disposed in front of the dash panel and close to the engine. Hence it is possible to achieve compact placement of the vehicle engine including the exhaust purification device. Further, as the exhaust purification device is disposed close to the engine, the exhaust gas passes through the exhaust purification device before the temperature of the exhaust gas decreases, and hence a temperature necessary for purification of the exhaust gas is ensured, leading to a reliable purification of the exhaust gas.

Since the exhaust purification device is disposed in the position overlapping the floor tunnel region of the body as viewed from the longitudinal direction of the vehicle, even if the engine moves rearwardly at the time of collision of the vehicle, the exhaust purification device is accommodated within the floor tunnel region, thereby preventing damage caused by the exhaust purification system to the other parts. This ensures the collision safety of the vehicle.

Further, the exhaust manifold is disposed at a predetermined distance from the dash panel and the exhaust purification device is disposed below the exhaust manifold and to one side of the center of the engine in the cylinder-array direction, therefore, a space is formed between the exhaust manifold and the dash panel on the other side of the center of the exhaust manifold in the cylinder-array direction. Thus, even if the engine moves rearwardly at the time of collision of the vehicle, collision of the exhaust manifold with the dash panel is avoided, thereby preventing damage caused by the exhaust manifold to the dash panel. This ensures the collision safety of the vehicle.

In the present invention, it is preferable that the dash panel be fitted with an auxiliary machine on the outside of the other-side end of the exhaust manifold in the cylinder-array direction as viewed from the longitudinal direction of the vehicle.

According to the present invention as thus configured, the dash panel is fitted with an auxiliary machine on the outside of the other-side end of the exhaust manifold in the cylinder-array direction as viewed from the longitudinal direction of the vehicle, therefore, even if the engine and the exhaust manifold move rearwardly at the time of collision of the vehicle, collision of the exhaust manifold with the auxiliary machine is avoided. Hence the damage caused by the exhaust manifold to the other parts is prevented thereby ensuring the collision safety of the vehicle.

In the present invention, it is preferable that the exhaust manifold is disposed in a position at a height corresponding to a lower portion of the auxiliary machine as viewed from the longitudinal direction of the vehicle According to the present invention as thus configured, the exhaust manifold is disposed at the height position corresponding to the lower portion of the auxiliary machine as viewed from the longitudinal direction of the vehicle. At the time of collision of the vehicle, if the exhaust manifold moves not rearwardly but obliquely toward the side where the auxiliary machine is disposed, the exhaust manifold is less likely to interfere with the auxiliary machine since being separated from the dash panel at a predetermined distance. Even if the exhaust manifold moves obliquely for more than a predetermined distance, the exhaust manifold interferes with only the lower portion of the auxiliary machine, therefore, the damage to the auxiliary machine due to the collision is minimized.

In the present invention, it is preferable that the auxiliary machine is a brake unit or an air conditioning unit.

According to the present invention as thus configured, the auxiliary machine is the brake unit or an air conditioning unit, therefore, damage caused by the exhaust manifold to the brake unit or the air conditioning unit at the time of collision of the vehicle is minimized.

In the present invention, it is preferable that a downstream-side portion of the exhaust purification device extends in the longitudinal direction of the vehicle from below the exhaust manifold toward the floor tunnel.

According to the present invention as thus configured, since the downstream-side portion of the exhaust purification device extends in the longitudinal direction of the vehicle, the exhaust gas from the exhaust purification device smoothly flows rearwardly, which facilitates discharge of the exhaust gas.

In the present invention, it is preferable that the downstream-side portion of the exhaust purification device includes, at an end on the floor tunnel side, an exhaust gas recirculation (EGR) gas leading part for taking a part of an exhaust gas passing the exhaust purification device as an EGR gas, the EGR gas leading part is disposed on an opposite side to a connection passage in the cylinder-array direction, and the EGR gas passage connected to the downstream side of the EGR gas leading part is disposed lateral to the exhaust purification device on the opposite side to the connection passage in the cylinder-array direction.

According to the present invention as thus configured, the EGR gas leading part is disposed on the opposite side to the connection passage in the cylinder-array direction, and the EGR gas passage is disposed lateral to the exhaust purification device on the opposite side to the connection passage in the cylinder-array direction, therefore, a wide space is ensured between the exhaust manifold and the dash panel on the connection passage side, namely, to one side of the center in the cylinder-array direction without being occupied by the EGR gas passage. This prevents damage caused by the exhaust manifold to the other parts such as the dash panel at the time of collision of the vehicle.

In the present invention, it is preferable that the EGR gas passage is disposed in a position overlapping the floor tunnel region as viewed from the longitudinal direction of the vehicle.

According to the present invention as thus configured, since the EGR gas passage is disposed in the position overlapping the floor tunnel region as viewed from the longitudinal direction of the vehicle, even if the engine moves rearwardly at the time of collision of the vehicle, the EGR gas passage is accommodated within the floor tunnel region, to prevent damage caused by the EGR gas passage to the other parts. This ensures the collision safety of the vehicle.

DESCRIPTION OF EMBODIMENTS

Hereinafter, preferred embodiments of the present invention will be described below with reference to the accompanying drawings. In a second embodiment and thereafter, similar constituents to in the first embodiment are provided with the same numerals as in the first embodiment and the description thereof will be simplified or omitted.

First Embodiment

Figure 1:
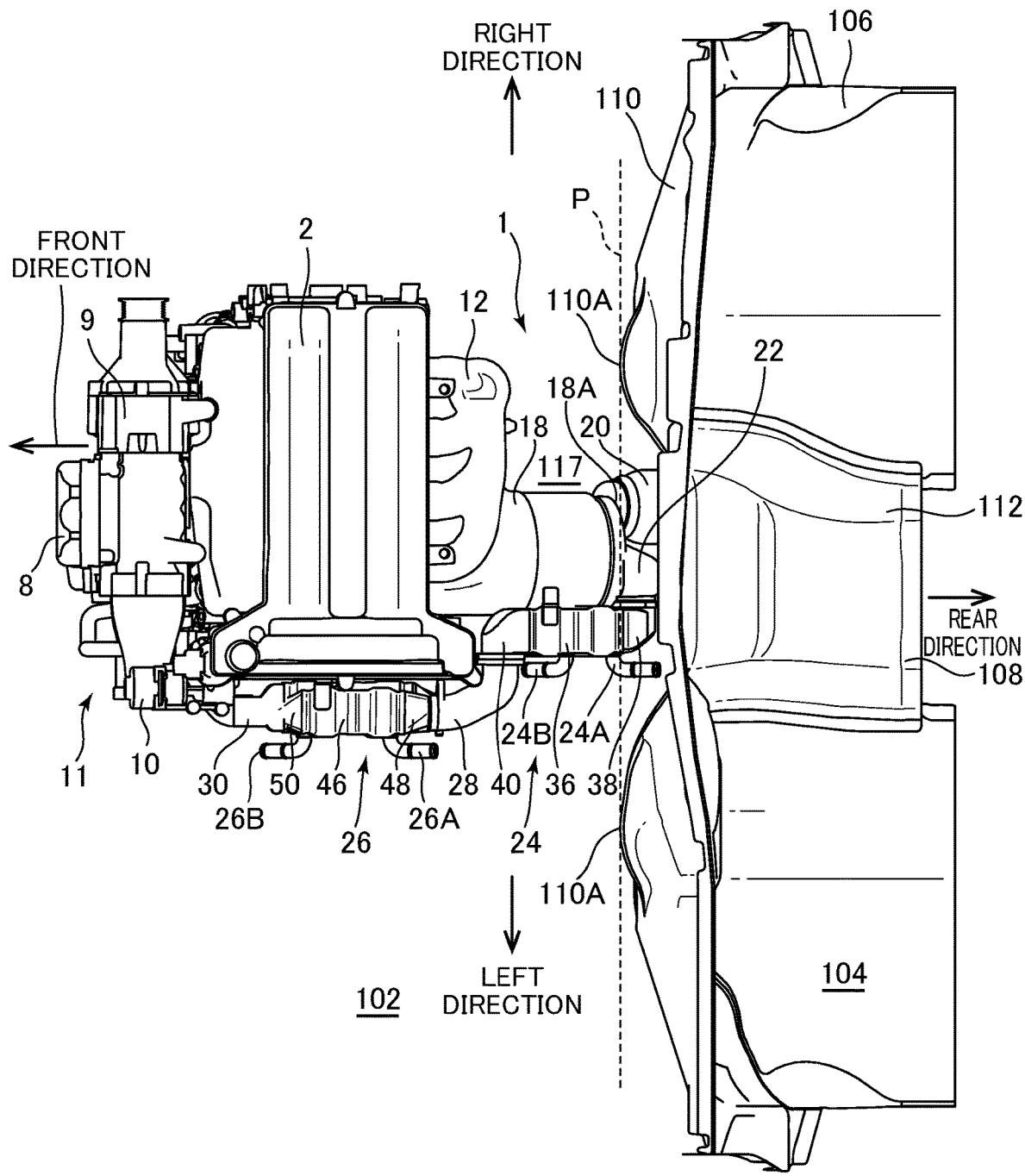
FIG. 1 is a plan view of an exhaust system device for a vehicle according to a first embodiment of the present invention.
Figure 2:
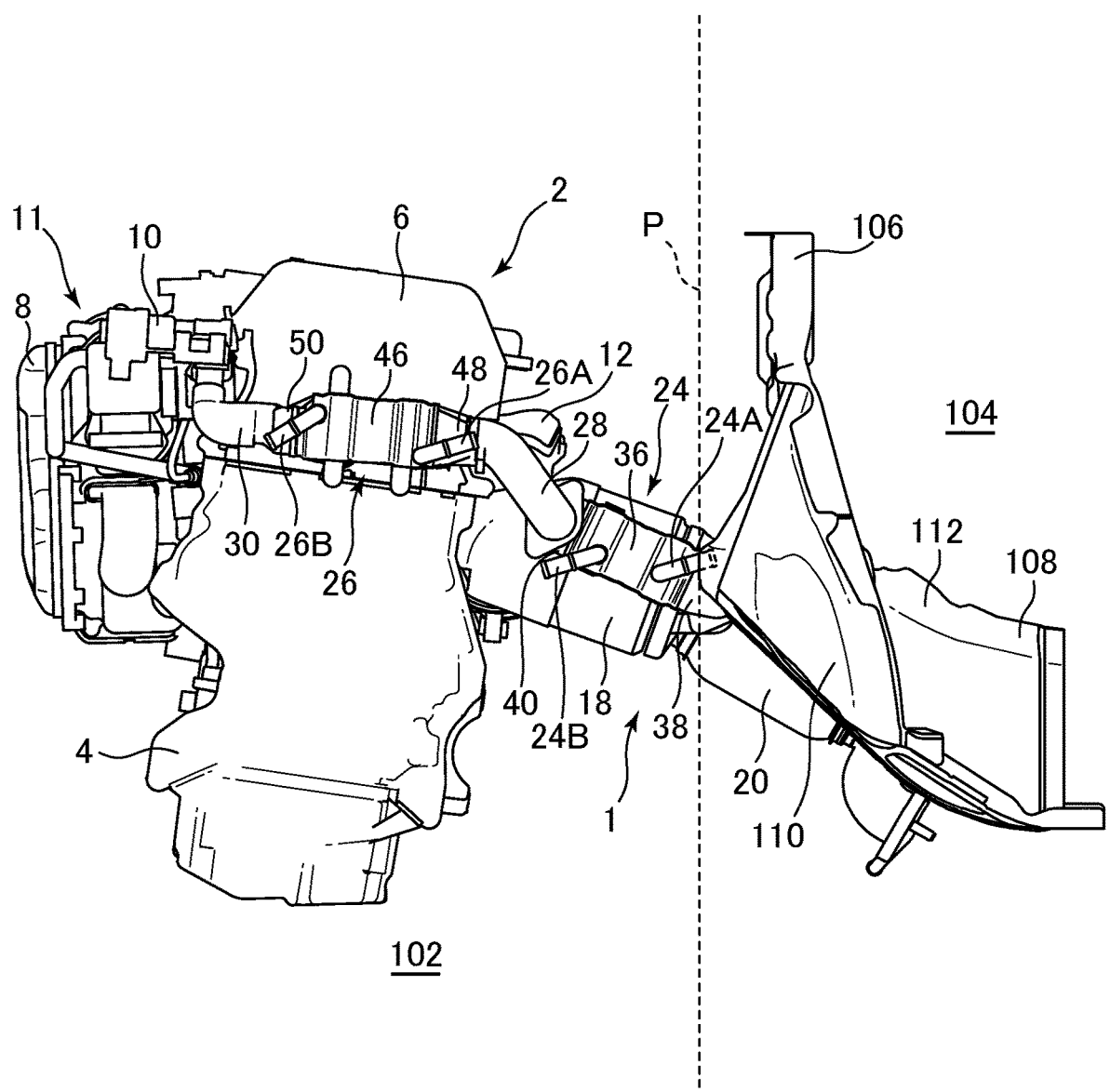
FIG. 2 is a side view of the exhaust system device for the vehicle according to the first embodiment of the present invention.
Figure 3:
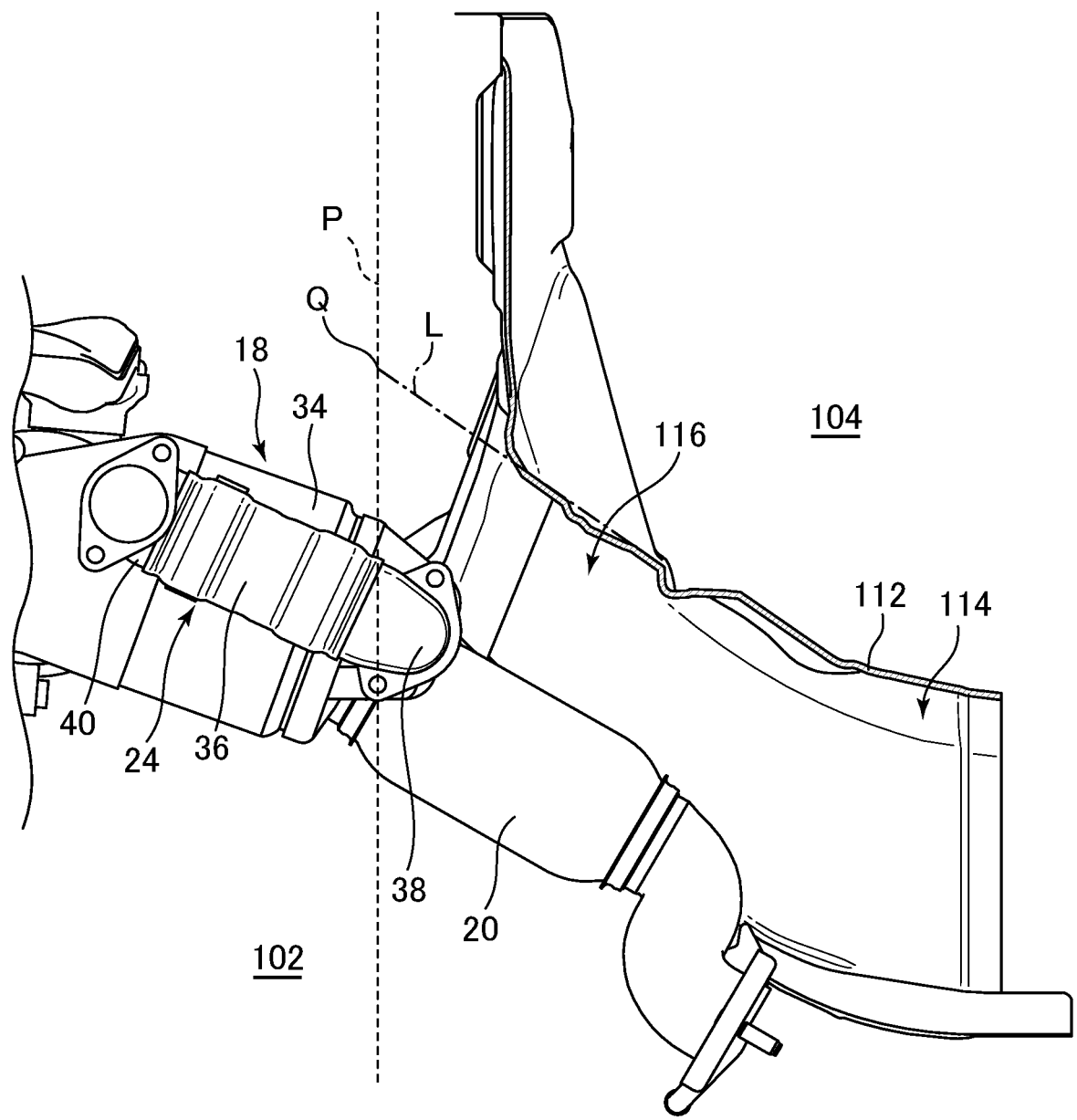
FIG. 3 is a side view of the exhaust system device for the vehicle according to the first embodiment of the present invention, with a part of the device broken.
Figure 4:
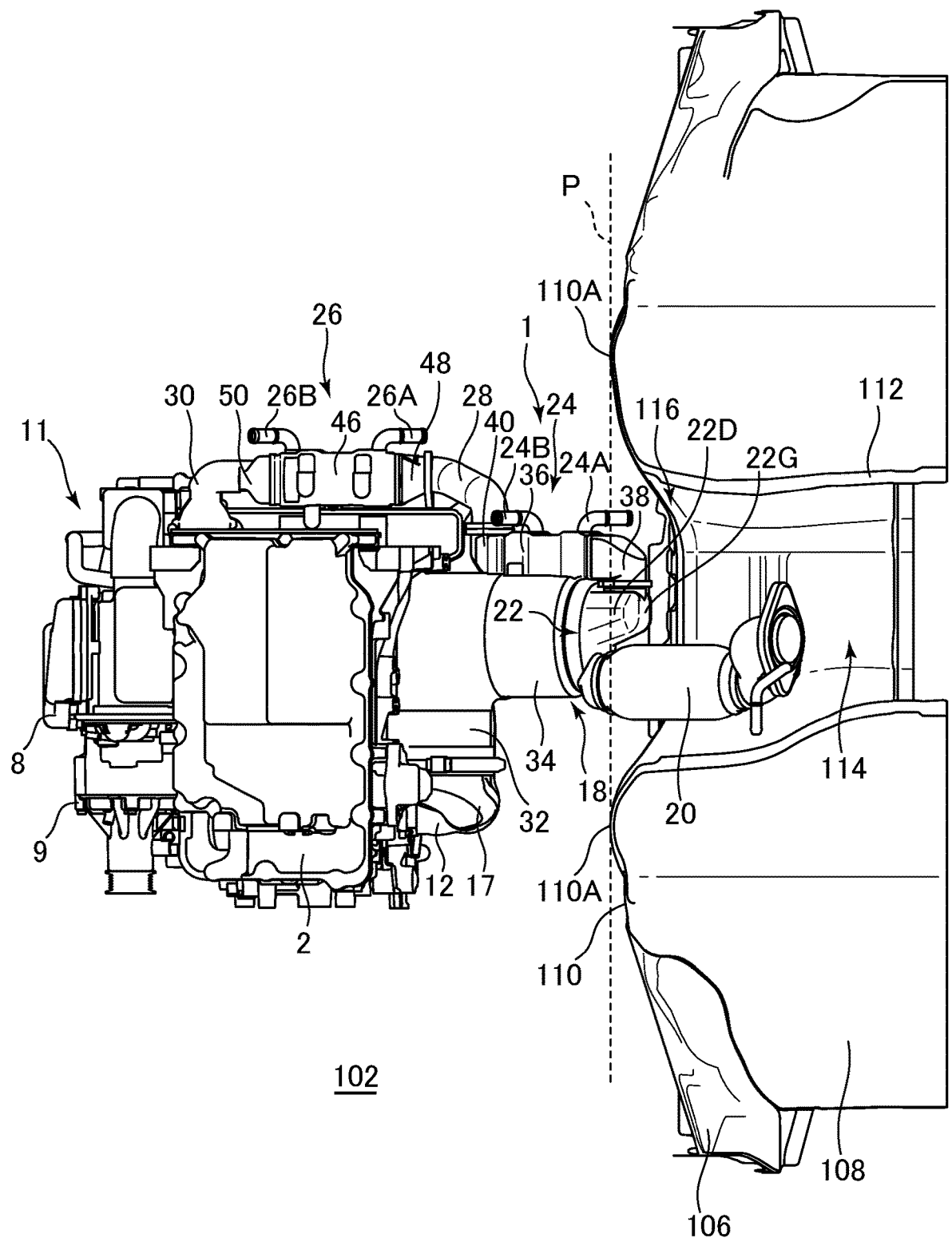
FIG. 4 is a bottom view of the exhaust system device for the vehicle according to the first embodiment of the present invention.

FIG. 1 shows a plan view of an exhaust system device 1 for a vehicle according to a first embodiment of the present invention, FIG. 2 shows a side view of the exhaust system device 1 for the vehicle according to the first embodiment of the present invention, FIG. 3 shows a side view of the exhaust system device 1 for the vehicle according to the first embodiment of the present invention, with a part of the device broken, and FIG. 4 shows a bottom view of the exhaust system device 1 for the vehicle according to the first embodiment of the present invention. FIG. 1 is a view of the exhaust system device 1 for the vehicle viewed from above, and in this figure, the horizontal direction indicates the longitudinal direction of the vehicle, the left side indicates the front direction of the vehicle, and the right side indicates the rear direction of the vehicle. Further, in this figure, the vertical direction indicates the vehicle-width direction of the vehicle, the upper side indicates the right direction of the vehicle, and the lower side indicates the left direction of the vehicle.

As shown in these FIGS. 1 to 4, the exhaust system device 1 for the vehicle according to the first embodiment of the present invention is applied to an engine 2 of a compression self-ignition system, such as a diesel engine or a homogeneous-charge compression ignition (HCCI) gasoline engine. The engine 2 includes a cylinder block 4 and a cylinder head 6 fitted to the upper portion of the cylinder block 4. In the present embodiment, inside an engine room 102, the engine 2 is disposed such that a crank shaft (not shown), is disposed along a vehicle-width direction of a vehicle 100, an intake system is disposed on the vehicle-front side of the engine 2, and an exhaust system is disposed on the vehicle-rear side of the engine 2, therefore, the engine 2 is thus a so-called front-intake rear-exhaust engine.

An intake manifold 8 integrated with a water-cooling inter cooler is fitted to the intake side of the engine 2, and a super-charger 9 is connected to the upstream side of the intake manifold 8 above the intake manifold 8, the super-charger 9 extending along the direction of the crank shaft of the engine 2, namely, along the vehicle-width direction of the vehicle 100 in the present embodiment. An EGR valve 10 is provided upstream of the supercharger 9. The EGR valve 10 is located to the left side of the center of the engine 2 in the vehicle-width direction, and more specifically, the EGR valve 10 is located at substantially the same position as the left-side side surface of the engine 2 in the vehicle-width direction. A pipe provided with the EGR valve 10, the super-charger 9, and a passage for intake which passes through the intake manifold 8 constitute an intake passage 11 in the present embodiment.

Figure 5:
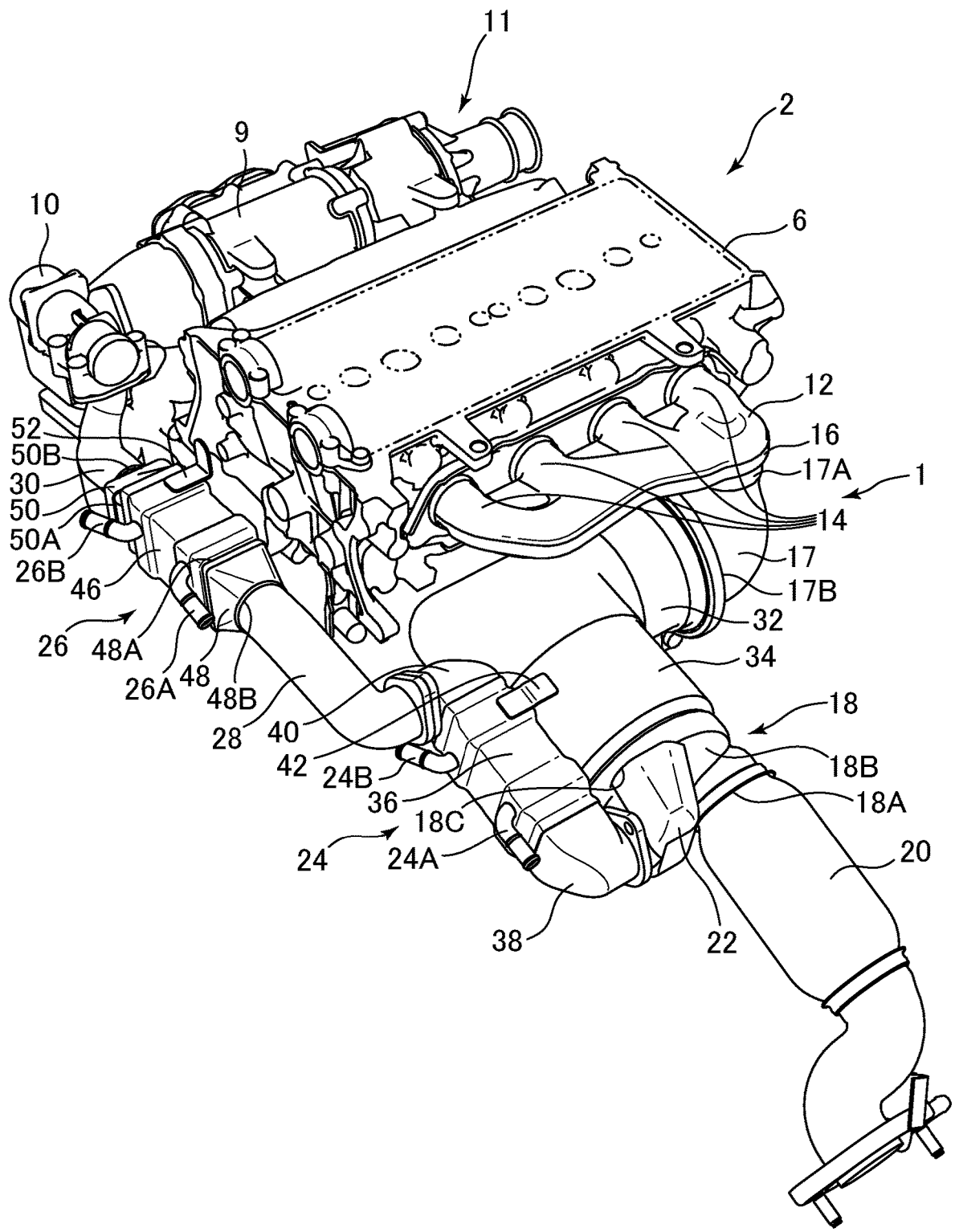
FIG. 5 is a perspective view of the exhaust system device for the vehicle according to the first embodiment of the present invention.

FIG. 5 is a perspective view of the exhaust system device for the vehicle according to the first embodiment of the present invention. As shown in this FIG. 5 and aforementioned FIGS. 1 to 4, an exhaust manifold 12 is fitted to the discharge side of the engine 2. The exhaust manifold 12 includes a plurality of discharge pipes 14 connected to exhaust ports (not shown) for respective cylinders (four cylinders in the present embodiment) of the engine 2, and a mixing tube 16 where exhaust gases passing through the discharge pipes 14 converge. The discharge pipes 14 respectively extend from the exhaust ports of the cylinder block 4 toward the rear side of the vehicle 100, extend while being bent to the right in the vehicle-width direction on the downstream thereof, and are connected to the mixing tube 16 on the right side of the exhaust manifold 12 while sequentially converging with the adjacent discharge pipes 14 on substantially the same horizontal planes. With such a structure, when the exhaust manifold 12 is viewed from above, the mixing tube 16 is disposed on the right side of the exhaust manifold 12 in the vehicle-width direction and also disposed to the right of the center of the engine 2 in the vehicle-width direction. The mixing tube 16 is open on the lower surface while vertically extending in a short distance. An exhaust system device 1 of the present embodiment is connected to the mixing tube 16 via an exhaust purification device introduction passage 17.

The exhaust purification device introduction passage 17 extends vertically and has a gas inlet 17A and a gas outlet 17B. The gas inlet 17A is open upward and is coupled to an opening of the mixing tube 16. The gas outlet 17B is open in a direction substantially orthogonal to the gas inlet 17A, and specifically, the gas outlet 17B is open to the left in the vehicle-width direction.

The exhaust system device 1 includes: an exhaust purification device 18 for purifying an exhaust gas received from the exhaust manifold 12; a flexible pipe 20 connected to the exhaust purification device 18 so as to discharge the exhaust gas passing through the exhaust purification device 18 to the outside; an EGR gas leading part 22 for taking out a part of the exhaust gas passing through the exhaust purification device 18 as an EGR gas; a first EGR cooler 24 and a second EGR cooler 26 connected to the EGR gas leading part 22 and for cooling the EGR gas taken out of the exhaust purification device 18; a first EGR pipe 28 coupling the first EGR cooler 24 with the second EGR cooler 26; and a second EGR pipe 30 coupling the second EGR cooler 26 with the intake passage 11.

The exhaust purification device 18 has a substantially L-shape as viewed from the above of the vehicle 100 and includes an upstream-side portion 32 connected to the mixing tube 16 of the exhaust manifold 12 and a downstream-side portion 34 provided downstream of the upstream-side portion 32 and connected to the flexible pipe 20 and the EGR gas leading part 22. In the present embodiment, the exhaust purification device 18 is connected to the mixing tube 16 of the exhaust manifold 12 via the exhaust purification device introduction passage 17. Hence the exhaust purification device introduction passage 17 functions as a connection passage that connects the exhaust manifold 12 with the exhaust purification device 18.

The upstream-side portion 32 is a substantially cylindrical portion coupled to the gas outlet 17B of the exhaust purification device introduction passage 17 and is disposed with its central axis (longitudinal axis) along the vehicle-width direction. Hence the outer surface of the upstream-side portion 32 is disposed adjacent to the outer surface of the cylinder block 4 of the engine 2. A catalyst device is incorporated in the upstream-side portion 32.

The downstream-side portion 34 is a substantially cylindrical portion integrally formed in the upstream-side portion 32 and is disposed with its central axis (longitudinal axis) substantially at the right angle to the central axis of the upstream-side portion 32. Further, the central axis of the downstream-side portion 34 extends in the longitudinal direction of the vehicle 100, and is disposed such that the upstream end of the downstream-side portion 34 is located above the downstream end, namely, such that the central axis is inclined downwardly from the upstream end to the downstream end of the downstream-side portion 34. A gasoline particulate filter (GPF) is incorporated in the downstream-side portion 34.

With such a structure, the upstream-side portion 32 of the exhaust purification device 18 is disposed along the vehicle-width direction below the exhaust manifold 12, and the downstream-side portion 34 is disposed along the longitudinal direction of the vehicle 100 on the left to the center of the engine 2 in the vehicle-width direction.

The flexible pipe 20 is a cylindrical member connected to an exhaust outlet 18A formed at the downstream end of the downstream-side portion 34 of the exhaust purification device 18 and is formed of a material extendable and retractable or bendable to a certain extent. The flexible pipe 20 is coupled to the exhaust outlet 18A disposed on the right side in the vehicle-width direction and the lower side in the vertical direction on the circular end surface 18B at the downstream end of the downstream-side portion 34 of the exhaust purification device 18. Further, the central axis (longitudinal axis) of the flexible pipe 20 extends in the longitudinal direction of the vehicle 100 and is disposed such that the downstream-side end is located below the upstream-side end, namely, such that the central axis is inclined downwardly from the upstream-side end to the downstream-side end, and an inclined angle of the central axis is set to be larger than an inclined angle of the downstream-side portion 34 of the exhaust purification device 18.

Figure 6:
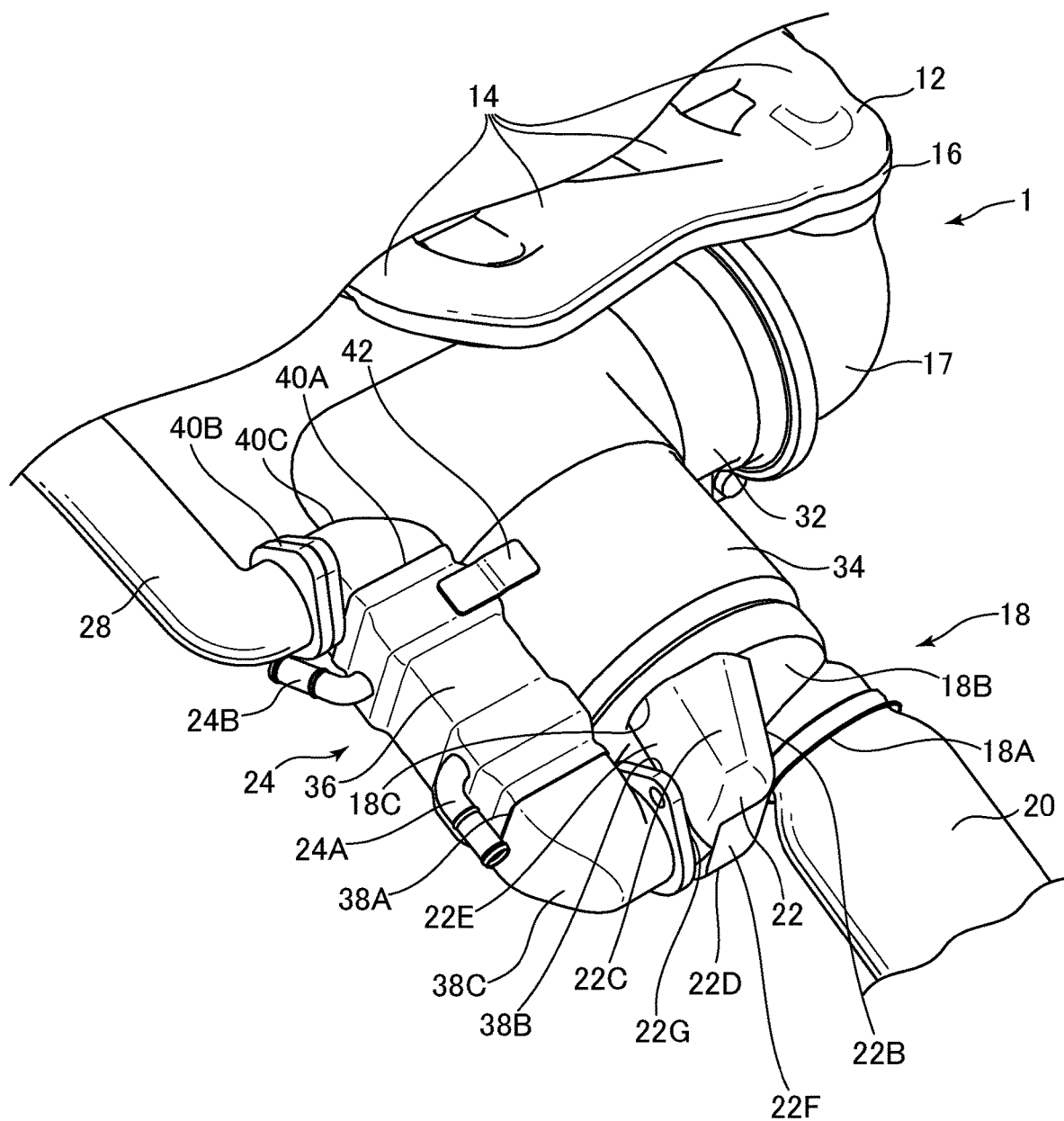
FIG. 6 is an enlarged perspective view showing a part of an exhaust system device of the vehicle according to the first embodiment of the present invention.

FIG. 6 is an enlarged perspective view showing a part of the exhaust system device for the vehicle according to the first embodiment of the present invention. As shown in this FIG. 6 and aforementioned FIGS. 1 to 5, the EGR gas leading part 22 is a tubular member coupled to an EGR gas outlet 18C formed at the downstream end of the downstream-side portion 34 of the exhaust purification device 18. The EGR gas leading part 22 is coupled to the EGR gas outlet 18C disposed at a position on the left side in the vehicle-width direction and the upper side in the vertical direction on the circular end surface 18B at the downstream end of the downstream-side portion 34. With such a placement, a connection part between the EGR gas leading part 22 and the exhaust purification device 18 is located above a connection part between the flexible pipe 20 and the exhaust purification device 18 and on the left thereto in the vehicle-width direction.

The longitudinal axis of the EGR gas leading part 22 is disposed along the longitudinal direction of the vehicle 100, namely, along a gas flow direction of an exhaust gas flowing through the downstream-side portion 34 and substantially parallel to the central axis of the downstream-side portion 34, and the upstream end 22A of the EGR gas leading part 22 is open to the surface intersecting with the axis parallel to the central axis of the downstream-side portion 34, which is the surface substantially orthogonal to the central axis of the downstream-side portion 34 in the present embodiment.

The EGR gas leading part 22 is formed in a substantially rectangular cross-section shape and tapered toward the downstream. Specifically, the EGR gas leading part 22 has a right side surface 22B, an upper surface 22C, a lower surface 22D, a left side surface 22E, and a downstream end surface 22F, the right side surface 22B is an inclined surface inclined to the left in the vehicle-width direction toward the downstream, the upper surface 22C is an inclined surface inclined downwardly toward the downstream and the lower surface 22D is an inclined surface inclined upwardly toward the downstream. However, the left side surface 22E has a flat surface parallel to the central axis of the downstream-side portion 34. Further, the downstream end surface 22F has a flat surface substantially orthogonal to the central axis of the downstream-side portion 34 of the exhaust purification device 18.

A downstream end 22G of the EGR gas leading part 22 is formed on the left side surface 22E, and hence an outlet (downstream end 22G) of the EGR gas leading part 22 is open to the left in the vehicle-width direction. The surface of the outlet of the EGR gas leading part 22, including the opening surface, is disposed so as to be in contact with the circumference of the downstream-side portion 34.

The first EGR cooler 24 is a water-cooling type EGR cooler and includes a first EGR cooler body 36, a first EGR gas flow-in part 38 formed at one upstream end of the first EGR cooler body 36, and a first EGR gas flow-out part 40 formed at the other downstream end of the first EGR cooler body 36.

The first EGR cooler body 36 is formed in a substantially rectangular parallelepiped, a longitudinal axis of the first EGR cooler body 36 is disposed substantially parallel to the central axis of the downstream-side portion 34 of the exhaust purification device 18, and one side surface of the first EGR cooler body 36 is disposed adjacent to the circumferential surface of the downstream-side portion 34.

A bracket 42 projecting from the side surface of the first EGR cooler body 36 toward the exhaust purification device 18 is provided on the upper surface of the first EGR cooler body 36, and by fixing this bracket 42 to the side surface of the downstream-side portion 34 of the exhaust purification device 18 by bolting, welding, or the like, the outer surface of the first EGR cooler 24 is fixed to the outer surface of the exhaust purification device 18. Hence the first EGR cooler 24 and the exhaust purification device 18 are fixed and fitted to each other in a place different from where the first EGR cooler 24 is connected to the exhaust purification device 18 via the EGR gas leading part 22.

The first EGR gas flow-in part 38 is located behind the first EGR cooler body 36 in the vehicle, is formed in a tubular shape, and is coupled integrally to the first EGR cooler body 36 at one end 38A on the first EGR cooler body 36 side. The other end of the first EGR gas flow-in part 38 is open to the right in the vehicle-width direction, namely, to the surface substantially orthogonal to the vehicle-width direction, to become a first EGR gas flow inlet 38B of the first EGR cooler 24. The first EGR gas flow inlet 38B is coupled to an outlet (downstream end 22G) of the EGR gas leading part 22, whereby the first EGR cooler 24 communicates with the EGR gas leading part 22. On a left side surface 38C of the first EGR gas flow-in part 38 in the vehicle-width direction, an inclined surface is formed which is inclined to the right toward the rear of the vehicle 100, namely, inclined to the gas flow inlet 38B (EGR gas leading part 22) side as going upstream of the first EGR gas flow-in part 38.

As thus described, the upstream end 22A of the EGR gas leading part 22 is open to the direction of the exhaust purification device 18 along the longitudinal direction of the vehicle 100, the downstream end 22G of the EGR gas leading part 22 is open to the left in the vehicle-width direction, the first EGR gas flow inlet 38A of the first EGR cooler 24 is open to the right, and the one end 38A is open to the direction along the longitudinal direction of the vehicle 100, whereby the direction of the path of the EGR gas leading from the EGR gas outlet 18A of the exhaust purification device 18 to the upstream end of the first EGR cooler body 36 is changed from the rear of the vehicle 100 to the left in the vehicle-width direction at the EGR gas leading part 22 and is then changed to the front at the first EGR gas flow-in part 38, and as a whole, the direction is rotated from the rear to the front by 180°. Further, the first EGR cooler 24 is disposed on the left to the downstream-side portion 34 of the exhaust purification device 18 in the vehicle-width direction, and whereby, the first EGR cooler 24 is adjacent to the side surface of the exhaust purification device 18 on the EGR valve 10 side of the intake passage 11 with respect to the vehicle-width direction.

The first EGR gas flow-out part 40 is located in front of the first EGR cooler body 36 in the vehicle, is formed in a tubular shape, and is coupled integrally to the first EGR cooler body 36 at one end 40A on the first EGR cooler body 36 side. The other end of the first EGR gas flow-out part 40 is open to the left in the vehicle-width direction, namely, to the surface substantially orthogonal to the vehicle-width direction, to become a first EGR gas flow outlet 40B of the first EGR cooler 24. The first EGR gas flow outlet 40B is coupled to one end of the first EGR pipe 28. On a right-side surface 40C of the first EGR gas flow-out part 40 in the vehicle-width direction, an inclined surface is formed which is inclined to the left toward the front of the vehicle 100, namely, inclined to the first EGR gas flow outlet 40B (first EGR pipe 28) side as going downstream of the first EGR gas flow-out part 40.

The first EGR cooler 24 with such a structure as described above is disposed as inclined downwardly toward the upstream side, namely, inclined downwardly toward the rear of the vehicle. Hence the first EGR gas flow outlet 40B of the first EGR cooler 24 is located above the first EGR gas flow inlet 38B. The inclined angle of the first EGR cooler 24 is larger than the inclined angle of the downstream-side portion 34 of the exhaust purification device 18 and is substantially the same as the inclined angle of the flexible pipe 20.

Further, in the side view, the first EGR cooler 24 is accommodated within a vertical dimension of the downstream-side portion 34 of the exhaust purification device 18, and in the side view, the first EGR cooler 24 does not project upward or downward from the exhaust purification device 18.

The second EGR cooler 26 is a water-cooling type EGR cooler, and includes a second EGR cooler body 46, a second EGR gas flow-in part 48 formed at one end of the second EGR cooler body 46 on the upstream side, and a second EGR gas flow-out part 50 formed at the other end of the second EGR cooler body 46 on the downstream side.

The second EGR cooler body 46 is formed in a substantially rectangular parallelepiped, a longitudinal axis of the second EGR cooler body 46 is disposed along the longitudinal direction of the vehicle 100, and one side surface of the second EGR cooler body 46 is disposed adjacent to the left surface of the cylinder block 4 of the engine 2.

Further, a bracket 52 projecting upward from the upper surface of the second EGR cooler body 46 or projecting downward from the lower surface thereof is provided on each of the upper surface and the lower surface of the second EGR cooler body 46, and by fixing this bracket 52 to the left side surface of the cylinder block 4 by bolting, welding, or the like, the outer surface of the second EGR cooler 26 is fixed and fitted to the outer surface of the cylinder block 4.

The second EGR gas flow-in part 48 is located behind the second EGR cooler body 46 in the vehicle, is formed in a tubular shape, and is coupled integrally to the second EGR cooler body 46 at one end 48A on the second EGR cooler body 46 side. The other end of the second EGR gas flow-in part 48 is open to the rear of the vehicle 100, to become a second EGR gas flow inlet 48B of the second EGR cooler 26. The second EGR gas flow inlet 48B is coupled to the other end of the first EGR pipe 28.

The second EGR gas flow-out part 50 is located in front of the second EGR cooler body 46 in the vehicle, is formed in a tubular shape, and is coupled integrally to the second EGR cooler body 46 at one end 50A on the second EGR cooler body 46 side. The other end of the second EGR gas flow-out part 50 is open to the front of the vehicle 100, to become a second EGR gas flow outlet 50B of the second EGR cooler 26. The second EGR gas flow outlet 50B is coupled to one end of the second EGR pipe 30.

The second EGR cooler 26 with such a structure as described above is disposed as inclined downwardly toward the upstream side, namely, inclined downwardly toward the rear of the vehicle. Hence the second EGR gas flow inlet 48B is disposed below the second EGR gas flow outlet 50B in the vehicle vertical direction. The inclined angle of the second EGR cooler 26 is smaller than the inclined angle of the downstream-side portion 34 of the exhaust purification device 18. Further, the second EGR gas flow inlet 48B is disposed above the first EGR gas flow outlet 40B of the first EGR cooler 24 and on the left thereto in the vehicle-width direction. With such a placement, the second EGR cooler 26 is located above the exhaust purification device 18 and the first EGR cooler 24 and on the left thereto in the vehicle-width direction.

Note that the first EGR cooler 24 and the second EGR cooler 26 are the water-cooling types and are thus provided with cooling water inlets 24A, 26A and cooling water outlets 24B, 26B, respectively. The cooling water outlet 24B of the first EGR cooler 24 communicates with the cooling water inlet 26A of the second EGR cooler 26, and hence cooling-water circuits of the first EGR cooler 24 and the second EGR cooler 26 are coupled in series. Cooling water passing through the first EGR cooler 24 and the second EGR cooler 26 and come out of the cooling water outlet 26B cools each part of the engines, such as the cylinder head and the cylinder block wall surface, while being cooled by a radiator as needed, and returns to the cooling-water inlet 24A of the first EGR cooler 24.

The first EGR pipe 28 is a tubular member communicating the first EGR gas flow-out part 40 of the first EGR cooler 24 with the second EGR gas flow-in part 48 of the second EGR cooler 26 and is formed of a rubber hose in the present embodiment. The first EGR pipe 28 is coupled to the first EGR gas flow-out part 40 along the vehicle-width direction, extends while being bent upward and to the front of the vehicle 100, and is coupled to the second EGR gas flow-in part 48 along the direction to the front of the vehicle 100.

The second EGR pipe 30 is a tubular member communicating with the second EGR gas flow-out part 50 of the second EGR cooler 26 and the intake passage 11. The second EGR pipe 30 extends along the direction to the front of the vehicle 100, extends while being bent upward on the lower side of the intake passage 11, and is coupled to the EGR valve 10 from below.

In the present embodiment, there is formed an EGR gas passage including the first EGR cooler 24, the second EGR cooler 26, the first EGR pipe 28, and the second EGR pipe 30, for supplying a part of an exhaust gas taken out of the exhaust purification device 18 to the intake side as an EGR gas.

Here, the placement of the exhaust system device 1 with respect to the vehicle 100 will be described.

As shown in FIGS. 2 to 4, the engine 2 and the exhaust system device 1 are disposed in the engine room 102 of the vehicle 100, and a vehicle interior 104 is formed behind the engine room 102. The engine room 102 and the vehicle interior 104 are partitioned by a dash panel 106. The dash panel 106 includes a lower dash panel 108 disposed in a lower part of the vehicle interior 104, and an upper lower dash panel 110 coupled to the front end of the lower dash panel 108 and extending to the front part of the vehicle interior 104 in the vehicle-width direction.

A floor tunnel 112 extending in the longitudinal direction of the vehicle 100 and projecting to the vehicle interior 104 side is formed in the lower dash panel 108 and the upper lower dash panel 110. A floor tunnel region 114 is a lower-side region of the floor tunnel 112, is surrounded by a projecting portion of the floor tunnel 112 and open downward, and includes in its front-end portion a tunnel extension region 116 having cross-sectional area which increases toward the front of the vehicle 100. In the tunnel extension region 116, as shown in FIGS. 1 and 4, the width of the floor tunnel region 114 in the vehicle-width direction gradually increases as viewed from the vertical direction of the vehicle 100, and this increase in the width stops at a front end 110A projecting to the frontmost end side of the upper lower dash panel 110 on each side of the floor tunnel region 114 in the vehicle-width direction. Therefore, in the present embodiment, the front end of the tunnel extension region 116 is located on a vertical plane P passing through the front end 110A of the upper lower dash panel 110. As thus described, the tunnel extension region 116 means a region to a position where the width of the floor tunnel region 114 in the vehicle-width direction stops increasing, and the floor tunnel region 114 includes the tunnel extension region 116.

Moreover, as shown in FIGS. 2 and 3, in the side view of the vehicle 100, the upper surface and the lower surface of the floor tunnel region 114 are inclined upwardly toward the front. FIGS. 2 and 3 also show the plane P being the front end of the tunnel extension region 116. In the side view of the vehicle 100, a position Q where the plane P at the front end of the tunnel extension region 116 intersects with a line L extending from the upper end of the floor tunnel 112 is the upper end of the tunnel extension region 116. Further, as viewed from the front of the vehicle 100, the border of the tunnel extension region 116 in the vehicle-width direction is located at the front end 110A of the upper lower dash panel 110.

In the exhaust system device 1 for the vehicle of the present embodiment, the center of the engine 2 in the width direction is located to the right of the center of the floor tunnel region 114 in the width direction. The exhaust purification device 18, the flexible pipe 20, the EGR gas leading part 22, the first EGR cooler 24, and the second EGR cooler 26 are disposed at positions overlapping the floor tunnel region 114, as viewed from the front of the vehicle 100. That is, in the present embodiment, the EGR gas passage is disposed at positions overlapping the floor tunnel region 114 as viewed from the front of the vehicle 100. The exhaust purification device 18, a part of the flexible pipe 20, the EGR gas leading part 22, and the first EGR cooler 24 are also disposed at positions overlapping a region other than the tunnel extension region 116 in the floor tunnel region 114, as viewed from the front of the vehicle 100.

Moreover, as shown in FIGS. 1 to 4, the vehicle-rear-side portions of the exhaust purification device 18 and the first EGR cooler 24 are disposed within the floor tunnel region 114. More specifically, a part of the downstream-side end of the exhaust purification device 18, most of the EGR gas leading part 22, most of the first EGR gas flow-in part 38 of the first EGR cooler 24, and most of the flexible pipe 20 are disposed within the tunnel extension region 116 which is the vehicle-front-side end of the floor tunnel region 114. Therefore, the downstream-side end of the exhaust purification device 18, the EGR gas leading part 22, the first EGR gas flow-in part 38, and the flexible pipe 20 are disposed so as to overlap the floor tunnel region 114 as viewed from the vertical direction and the lateral side of the vehicle 100.

With such a placement, the exhaust manifold 12 is disposed in a position separated at a predetermined distance from the front end of the dash panel 106 in the longitudinal direction. A space 117 (cf. FIG. 1) in which constituent parts of the exhaust system device 1 are not disposed is formed between the rear end of the exhaust manifold 12 and the front end of the dash panel 106 and to the right side of the exhaust purification device 18 in the width direction of the engine 2.

The exhaust system device 1 for the vehicle with such a structure acts as follows.

First, an exhaust gas discharged from the engine 2 passes through the discharge pipe 14 of the exhaust manifold 12, merges into the mixing tube 16, flows downward, and flows into the exhaust purification device introduction passage 17. The exhaust gas flown into the exhaust purification device introduction passage 17 changes its direction from the below to the left in the vehicle-width direction and enters the exhaust purification device 18. In the exhaust purification device 18, the exhaust gas passes to the left through the catalyst device of the upstream-side portion 32, passes to the rear of the vehicle 100 through the GPF of the downstream-side portion 34, and is purified. A part of the exhaust gas after the passage through the downstream-side portion 34 comes out of the exhaust outlet 18A, passes through the flexible pipe 20, and is then discharged out of the vehicle through a muffler or the like (not shown).

Meanwhile, the remaining part of the exhaust gas after the passage through the downstream-side portion 34 flows as the EGR gas from the EGR gas outlet 18C into the EGR gas leading part 22 toward the rear of the vehicle 100. The EGR gas changes the gas flow direction to the left in the vehicle-width direction while being guided to the right side surface 22B, the upper surface 22C, and the lower surface 22D of the EGR gas leading part 22, and changes the gas flow direction to the front while being guided to the left side surface 38C of the first EGR gas flow-in part 38 of the first EGR cooler 24, to rotate the gas flow direction by 180°.

The EGR gas flowing toward the front of the vehicle 100 enters the first EGR cooler body 36 from the first EGR gas flow-in part 38 to be cooled and comes out of the first EGR gas flow-out part 40 into first EGR pipe 28 while changing the gas flow to the left in the vehicle-width direction. The EGR gas passing through the first EGR pipe 28 flows into the second EGR cooler 26 toward the front of the vehicle 100, is further cooled by the second EGR cooler 26, enters the second EGR pipe 30 from the second EGR cooler 26 toward the front of the vehicle 100, and flows into the intake passage 11 via the EGR valve 10.

The exhaust system device 1 for the vehicle with such a structure achieves effects as described below.

The exhaust manifold 12 is disposed at a predetermined distance from the dash panel 106, and the exhaust purification device 18 is disposed below the exhaust manifold 12, therefore, the exhaust purification device 18 of the engine 2 is disposed in front of the dash panel 106 and close to the engine 2. Hence it is possible to achieve compact placement of the engine 2 including the exhaust purification device 18. Further, since the exhaust purification device 18 is disposed close to the engine 2, it is possible to allow passage of the exhaust gas through the exhaust purification device 18 before the temperature of the exhaust gas decreases. It is thereby possible to ensure a temperature necessary for purification of the exhaust gas to reliably purify the exhaust gas.

Since the exhaust purification device 18 is disposed in the position overlapping the floor tunnel region 114 of the body as viewed from the longitudinal direction of the vehicle 100, even if the engine 2 moves rearwardly at the time of collision of the vehicle, the exhaust purification device 18 is accommodated within the floor tunnel region 114. This can prevent damage caused by the exhaust purification device 18 to the other parts. It is thereby possible to ensure the collision safety of the vehicle 100.

Moreover, since the exhaust manifold 12 is disposed at a predetermined distance from the front end of the dash panel 106 and the exhaust purification device 18 is disposed below the exhaust manifold 12 and to one side of the center, specifically on the left side, of the engine 2 in the cylinder-array direction, a space 117 is formed between the exhaust manifold 12 and the dash panel 106 to the other side of the center, specifically on the right side, of the exhaust manifold 12 in the cylinder-array direction. Thus, even if the engine 2 moves rearwardly at the time of collision of the vehicle, it is possible to avoid collision of the exhaust manifold 12 with the dash panel 106, and to prevent damage caused by the exhaust manifold 12 to the dash panel 106. It is thereby possible to ensure the collision safety of the vehicle 100.

Since the downstream-side portion 34 of the exhaust purification device 18 extends in the longitudinal direction of the vehicle 100 from below the exhaust manifold 12 toward the floor tunnel 112, the exhaust gas from the exhaust purification device 18 smoothly flows rearwardly, which can facilitate discharge of the exhaust gas.

The downstream-side portion 34 of the exhaust purification device 18 includes an EGR gas leading part 22 at the end on the floor tunnel 112 side, namely the rear-side end, and the EGR gas leading part 22 is disposed on the opposite side to the exhaust purification device introduction passage 17 (connection passage) in the cylinder-array direction. In addition, the EGR gas passage is disposed lateral to the exhaust purification device 18 on the opposite side to the exhaust purification device introduction passage 17 in the cylinder-array direction, namely to the left side of the exhaust purification device 18. Thus, the space 117 between the exhaust manifold 12 and the dash panel 106, on the exhaust purification device introduction passage 17 side, namely, one side of the center (on the right side) in the cylinder-array direction, is not occupied by the EGR gas passage, therefore, the wide space 117 can be ensured. By ensuring the wide space 117 in this manner, it is possible to more reliably prevent damage caused by the exhaust manifold 12 to the other parts such as the dash panel 106 at the time of collision of the vehicle.

Since the EGR gas passage is disposed in the position overlapping the floor tunnel region 114 as viewed from the longitudinal direction of the vehicle 100, even if the engine 2 moves rearwardly at the time of collision of the vehicle, the parts forming the EGR gas passage, such as the first EGR gas flow-in part 38 and the first EGR cooler 24, are accommodated within the floor tunnel region 114. It is thus possible to prevent damage caused by the parts forming the EGR gas passage to the other parts and to ensure the collision safety of the vehicle 100.

The first EGR cooler 24 is adjacent to the exhaust purification device 18 and the outer surface of the first EGR cooler 24 is fitted to the outer surface of the downstream-side portion 34 of the exhaust purification device 18 with the bracket 42 such that the gas flow direction of the first EGR cooler 24 is opposite to the gas flow direction of the downstream-side portion 34 of the exhaust purification device 18 and that the central axis of the first EGR cooler 24 is disposed along the longitudinal direction of the vehicle 100, thereby eliminating the need to fit the first EGR cooler 24 to the cylinder block 6 of the engine 4 as in the conventional case. It is thus possible to enhance the flexibility in placement of the first EGR cooler 24. Further, since the outer surface of the first EGR cooler 24 is fixed to the outer surface of the downstream-side portion 34 of the exhaust purification device 18 with the bracket 42, the first EGR cooler 24 and the exhaust purification device 18 operate as one rigid body, which can suppress generation of resonance between the first EGR cooler 24 and the exhaust purification device 18.

The EGR gas leading part 22 is disposed behind the downstream-side portion 34 of the exhaust purification device 18 in the vehicle 100 and is disposed on the downstream side of the gas flow direction of the exhaust gas in the downstream-side portion 34, therefore, the exhaust gas flowing through the downstream-side portion 34 flows into the EGR gas leading part 22 without changing its direction. This can facilitate taking the EGR gas out of the exhaust purification device 18. Therefore, for example, when the engine 2 is being operated in a low-revolution low-load range, the flow rate of the exhaust gas becomes small, but even in such a case, a required flow rate of the exhaust gas can be ensured.

Since the EGR gas leading part 22 is disposed downstream of the exhaust purification device 18, it is possible to take an exhaust gas passing through the exhaust purification device 18 and thus being in an even lower temperature state as the EGR gas, therefore, it is thereby possible to supply the EGR gas with an even lower temperature to the engine 2.

Since the second EGR gas flow outlet 50B of the second EGR cooler 26 is located above the second EGR gas flow inlet 48B, when condensed water is generated in the second EGR cooler 26, the condensed water flows upstream from the second EGR gas flow outlet 50B side to the second EGR gas flow inlet 48B side. Further, since the second EGR gas flow inlet 48B is located above the first EGR gas flow outlet 40B of the first EGR cooler 24, the condensed water flows upstream to the first EGR cooler 24.

Moreover, since the first EGR gas flow inlet 38B of the first EGR cooler 24 is located below the first EGR gas flow outlet 40B, the condensed water flowing from the second EGR cooler 26 and condensed water generated in the first EGR cooler 24 flow upstream from the first EGR gas flow outlet 40B side to the first EGR gas flow inlet 38B side. Since the first EGR gas flow inlet 38B is located above the exhaust outlet 18A of the exhaust purification device 18, the condensed water flows toward the exhaust outlet 18A of the exhaust purification device 18. As the exhaust outlet 18A is connected to the flexible pipe 20, the condensed water is discharged to the outside through the flexible pipe 20.

With such a structure as described above, the condensed water generated in the first EGR cooler 24 and the second EGR cooler 26 can be discharged to the outside, thereby preventing suction of the condensed water to the engine 2 side. Hence it is possible to prevent water hammer which may occur due to suction of condensed water. In addition, it is possible to prevent accumulation of condensed water in the first EGR cooler 24, the second EGR cooler 26, and the first and second EGR pipes 28, 30, and to prevent corrosion of these parts.

With respect to the exhaust purification device 18 disposed on the rear of the engine 2, the first EGR cooler 24 is disposed adjacent to the left-side side surface of the exhaust purification device 18 in the vehicle-width direction, the first EGR pipe 28, the second EGR cooler 26, and the second EGR pipe 30 are disposed along the left-side side surface of the engine 2 in the vehicle-width direction, and the second EGR gas passage 30 communicates with the intake passage 11 at the position of the EGR valve 10 on the front left side of the engine 2. Therefore, the EGR gas path leading from the exhaust purification device 18 to the intake passage 11 through the first and second EGR coolers 24, 26 can be disposed on the left side of the engine 2 in the vehicle-width direction where the EGR valve 10 is disposed. It is therefore possible to make the EGR gas path short and the response of the EGR control favorable. Especially in the present embodiment, since the longitudinal axis of the downstream-side portion 34 of the exhaust purification device 18 is disposed on the left to the engine 2 in the vehicle-width direction, by disposing the EGR gas path which includes the first EGR cooler 24 and the second EGR cooler 26 along the left side of the engine 2 in the vehicle-width direction, the EGR gas path can be made even shorter.

Since the rear side ends of the exhaust purification device 18 and the first EGR cooler 24 overlap the floor tunnel region 114 as viewed from below and the side of the vehicle 100, even when the engine 2 and parts connected thereto move rearward at the time of collision of the vehicle 100, the exhaust purification device 18 and the first EGR cooler 24 are accommodated in the floor tunnel region 144. It is therefore possible to ensure the safety of vehicle passengers at the time of collision of the vehicle 100 and to prevent damage on the exhaust purification device 18 and the first EGR cooler 24. Further, with this placement, it is possible to dispose the exhaust purification device 18 and the first EGR cooler 24 such that the longitudinal axis follows the longitudinal direction of the vehicle 100 on the rear of the engine 2, while ensuring the safety of the vehicle passengers. Thus, the exhaust purification device 18 and the first EGR cooler 24 can also be disposed along the longitudinal direction as well as being disposed along the vehicle-width direction, thereby enhancing the flexibility in the placement direction of the exhaust purification device 18 and the first EGR cooler 24.

With the second EGR cooler 26 being provided downstream of the first EGR cooler 24, it is possible to ensure the required cooling capacity while suppressing increases in size of the first EGR cooler 24 and the second EGR cooler 26. Since the increase in size of the first EGR cooler 24 can be suppressed, it is possible to suppress the resonance between the first EGR cooler 24 and the exhaust purification device 18 to which the first EGR cooler 24 is fitted.

Since the first EGR pipe 28 is made up of the rubber hose, the vibrations of the first EGR cooler 24 and the second EGR cooler 26 can be absorbed. This enables suppression of the resonance between the first EGR cooler 24 and the second EGR cooler 26.

Second Embodiment

Next, a second embodiment of the present invention will be described. In the second embodiment, the turbo supercharger 62 is disposed behind the engine 2, and the EGR gas path leading from the exhaust purification device 18 to the intake passage is different as compared to that in the first embodiment.

Figure 7:
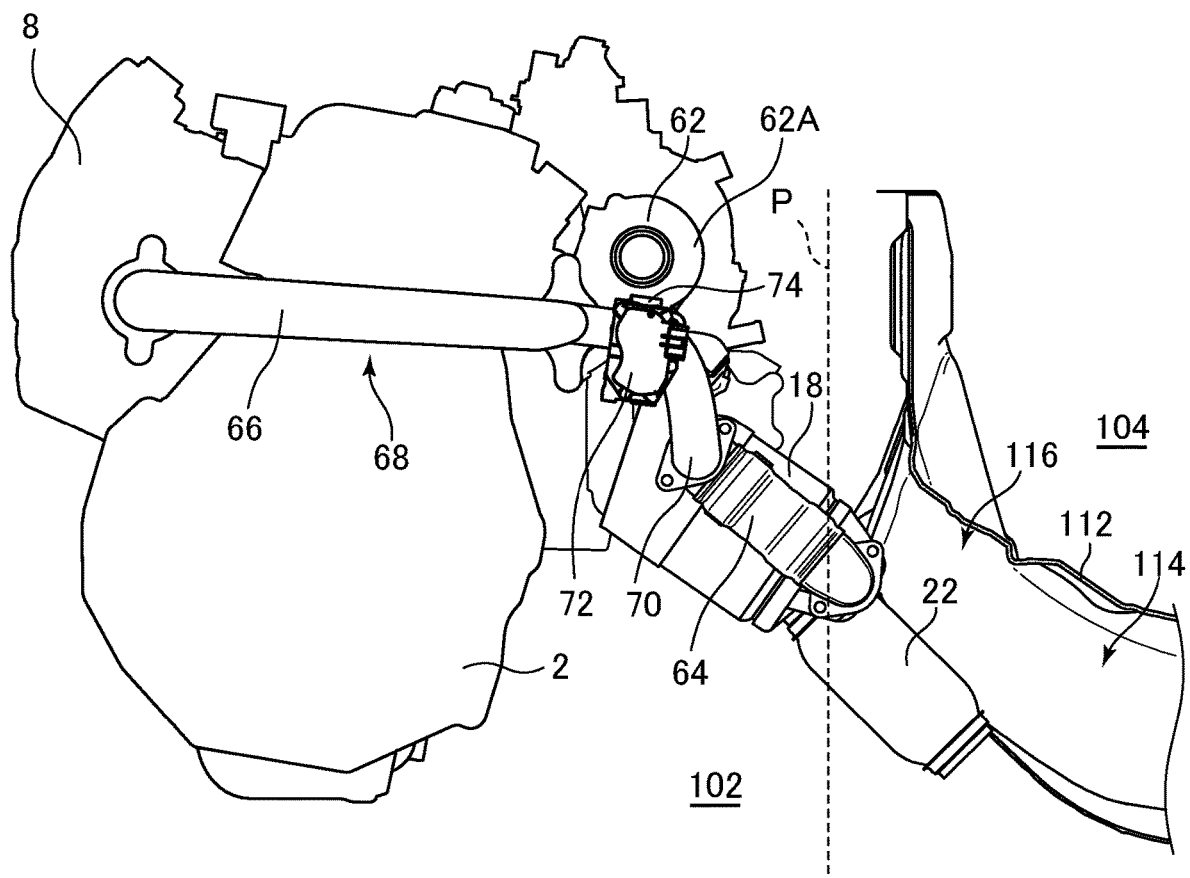
FIG. 7 is a side view of an exhaust system device for a vehicle according to a second embodiment of the present invention.

FIG. 7 is a side view of an exhaust system device 60 for a vehicle according to a second embodiment of the present invention. As shown in this FIG. 7, the turbo supercharger 62 is disposed behind the engine 2 and to the left of the center of the engine 2 in the vehicle-width direction. The turbo supercharger 62 includes a turbine (not shown) disposed on the right side and a compressor 62A disposed on the left side. The turbine is connected to the exhaust manifold 12, and the compressor 62A includes a compressor downstream passage 66 on the downstream side. The compressor downstream passage 66 has one end connected to the compressor 62A of the turbo supercharger 62, extends to the left end of the engine 2 in the vehicle-width direction along the vehicle-width direction behind the engine 2, extends so as to be inclined downwardly toward the front side along the left-side side surface of the engine 2 in the vehicle-width direction, and is connected to the intake manifold 8 on the front side of the engine 2. In the present embodiment, the passage of the intake gas from the compressor 62A of the turbo supercharger 62 to the intake manifold 8 through the compressor downstream passage 66 is an intake passage 68.

The exhaust purification device 18 is connected to the downstream side of the turbine. The upstream-side end (exhaust gas inlet) of the exhaust purification device 18 is disposed below the exhaust outlet of the turbo supercharger 62. The EGR gas leading part 22 and an EGR cooler 64 are connected to the downstream side of the exhaust purification device 18. The structure of the EGR cooler 64 is the same as that of the first EGR cooler 24 of the first embodiment, and hence its description will be omitted here. The EGR cooler 64 is adjacent to the left side of the exhaust purification device 18 in the vehicle-width direction and has the outer surface fitted to the outer surface of the exhaust purification device 18 with a bracket (not shown) as in the first embodiment. The exhaust purification device 18 and the EGR cooler 64 are inclined downwardly toward the rear of the vehicle 100 as in the first embodiment.

One end of an EGR cooler downstream passage 70 is connected to an EGR gas flow outlet 64A which is the downstream-side end of the EGR cooler 64. The EGR cooler downstream passage 70 extends so as to be inclined rearwardly along the longitudinal direction of the vehicle 100 on the left sides of the exhaust purification device 18 and the turbo supercharger 64 in the vehicle-width direction. The other end of the EGR cooler downstream passage 70 is connected to a portion of the compressor downstream passage 66 which extends in the vehicle-width direction behind the engine 2. An EGR valve 72 is provided in the middle of the EGR cooler downstream passage 70, and the EGR valve 72 is fixed to the turbo supercharger 62 with a bracket 74.

In an exhaust system device 60 with such a structure as in the first embodiment, a part of the exhaust gas coming out of the exhaust purification device 18 is taken out as the EGR gas by the EGR gas leading part 22 and cooled by the EGR cooler 64, and thereafter, the EGR gas is supplied to the compressor downstream passage 66 of the intake passage 68 through the EGR cooler downstream passage 70.

The exhaust system device 60 of the second embodiment with such a structure as above achieves effects as follows other than similar effects to those in the first embodiment.

In the structure where the turbo supercharger 62 is provided behind the engine 2 and the compressor downstream passage 66 is provided on the left side of the turbo supercharger 62 in the vehicle-width direction, the EGR cooler 64 is fitted to the left-side side surface of exhaust purification device 18 in the vehicle-width direction while being adjacent thereto, and the EGR cooler downstream passage 70 is also disposed on the left side of the exhaust purification device 18 in the vehicle-width direction. The EGR cooler downstream passage 70 is then connected to the portion of the compressor downstream passage 66 which extends along the vehicle-width direction behind the engine 2. With such a structure, both the EGR cooler 64 and the EGR cooler downstream passage 70 are provided on the left side of the turbo supercharger 62 in the vehicle-width direction where the compressor downstream passage 66 is provided, namely, on the left side of the exhaust purification device 18 in the vehicle-width direction, therefore, the EGR gas path leading from the exhaust purification device 18 to the compressor downstream passage 66 can be made short and the response of the EGR control can be made favorable.

Third Embodiment

Next, a third embodiment of the present invention will be described. In the third embodiment, a case will be described where the auxiliary machine is fitted to the dash panel 106, as compared to the first embodiment. Further, the third embodiment is different from the first embodiment in the configuration of the EGR gas path leading from the exhaust purification device 18 to the intake passage.

Figure 8:
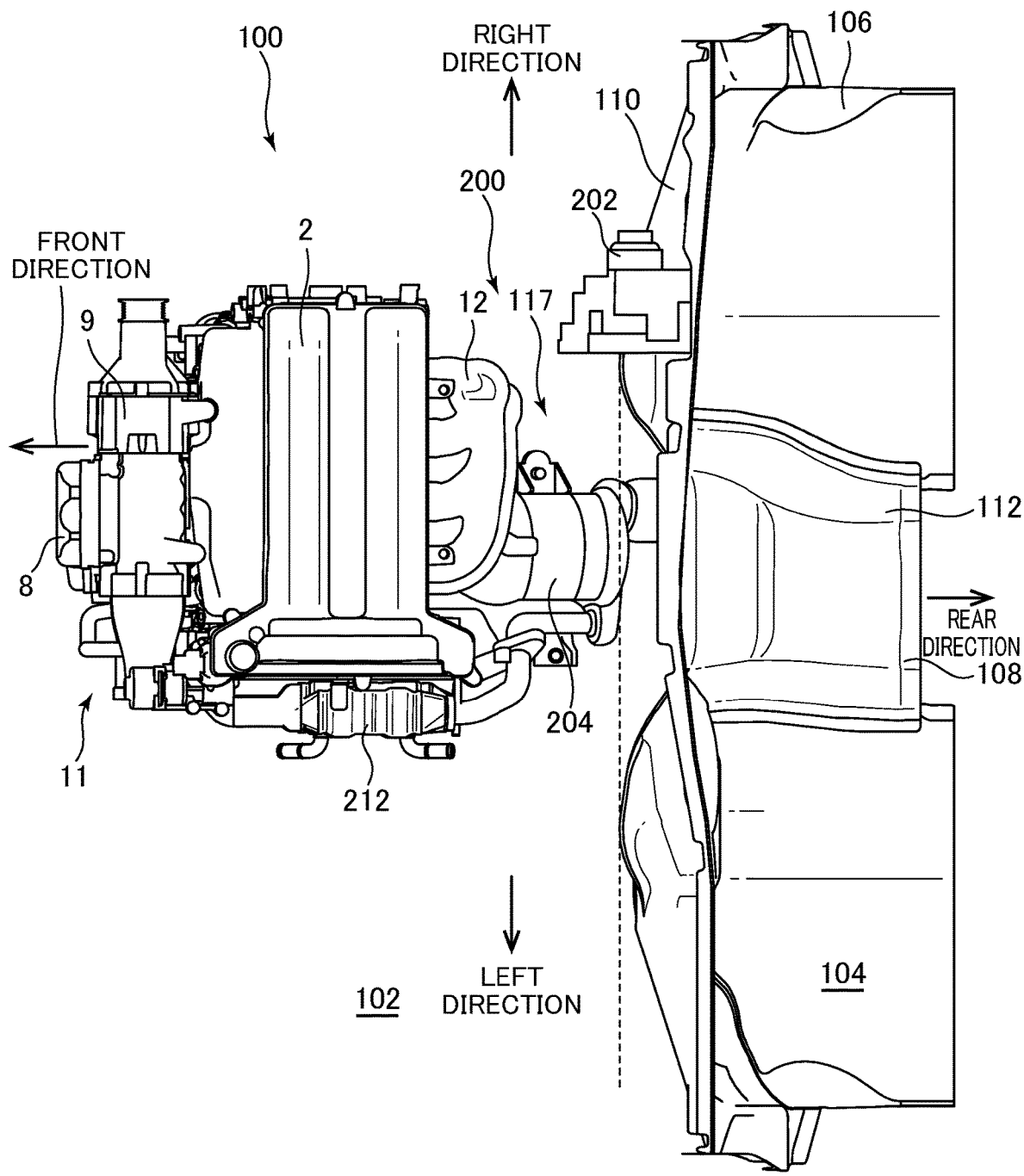
FIG. 8 is a plan view of an exhaust system device for a vehicle according to a third embodiment of the present invention.
Figure 9:
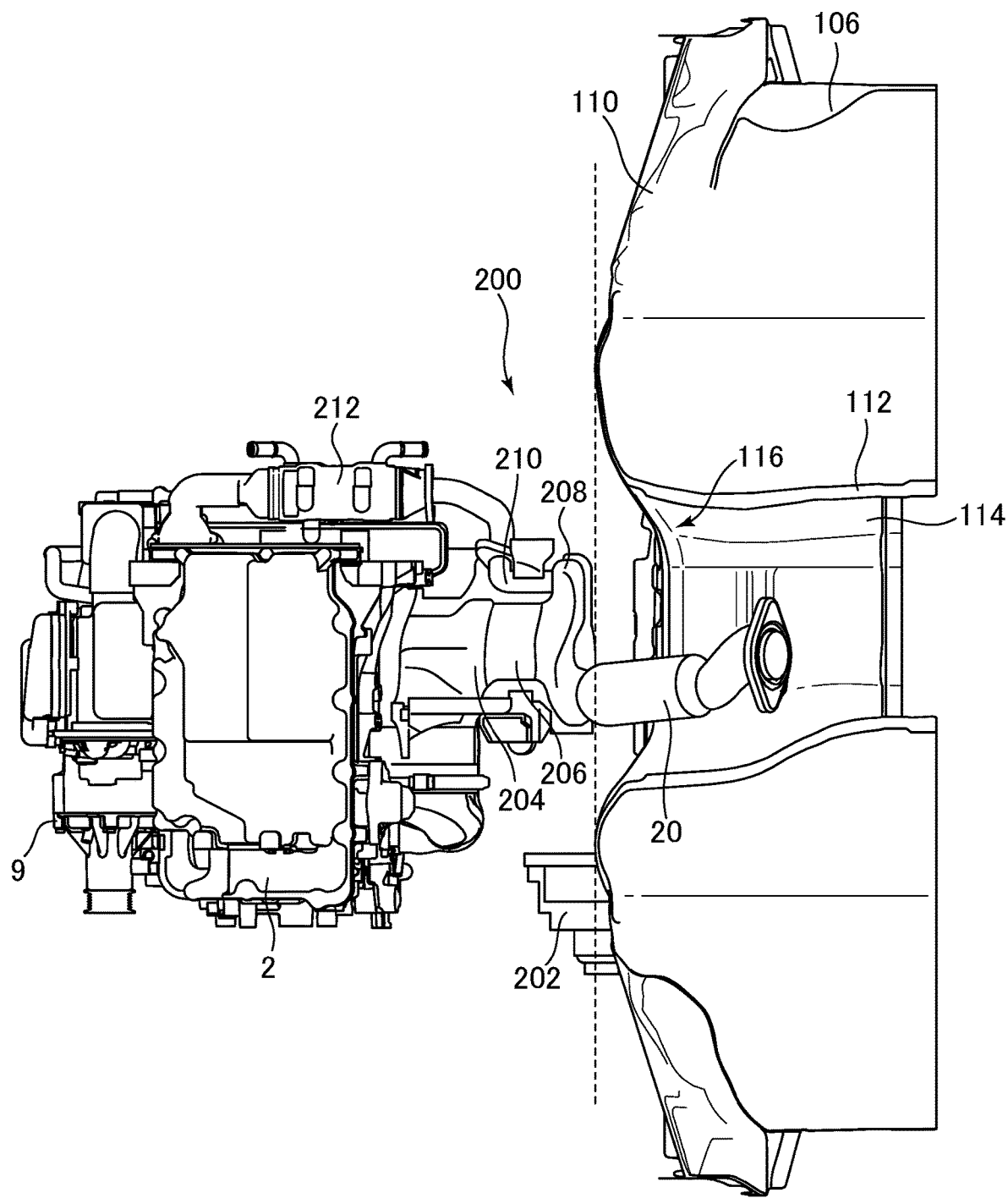
FIG. 9 is a bottom view of the exhaust system device for the vehicle according to the third embodiment of the present invention.
Figure 10:
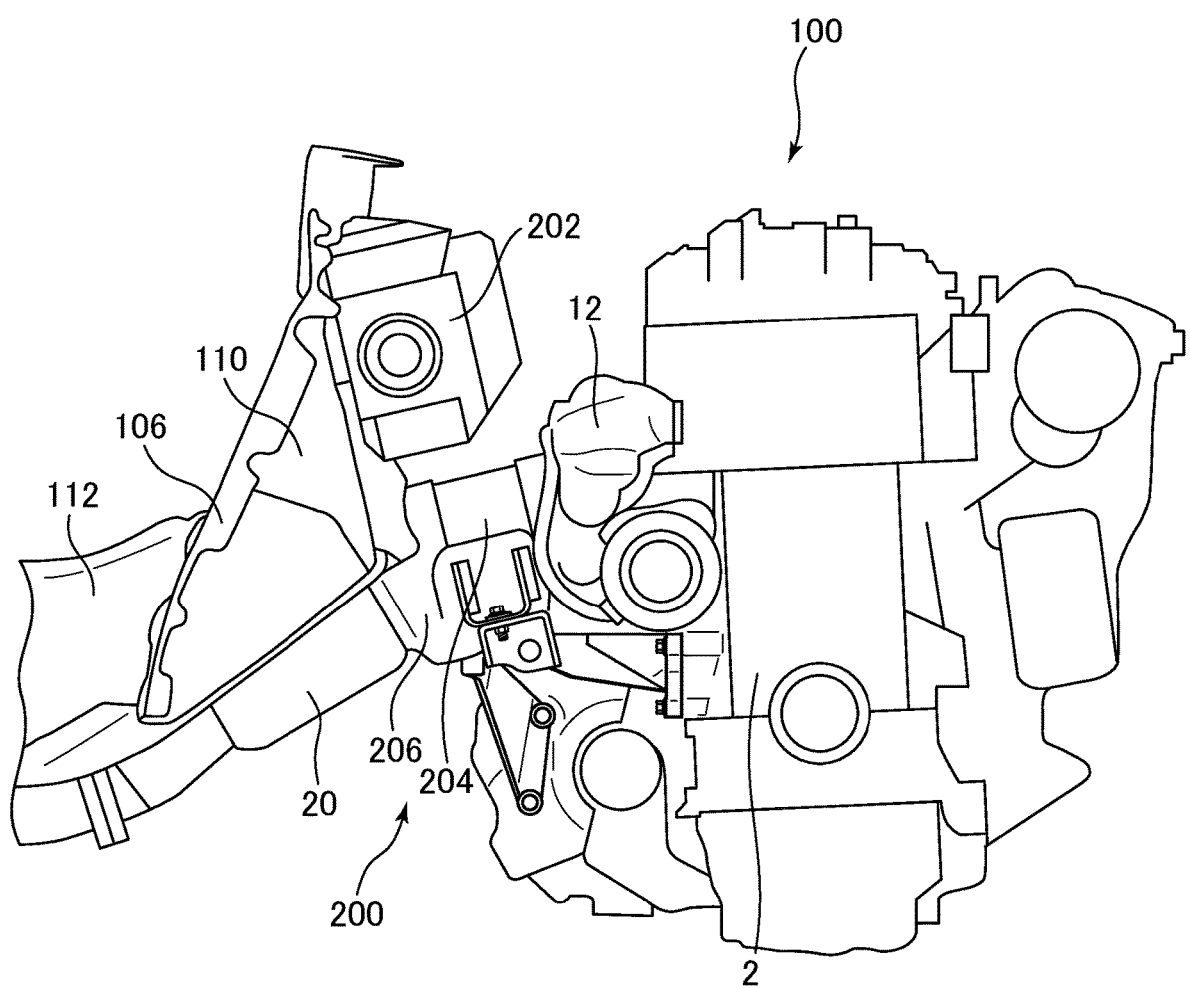
FIG. 10 is a side view of the exhaust system device for the vehicle according to the third embodiment of the present invention.
Figure 11:
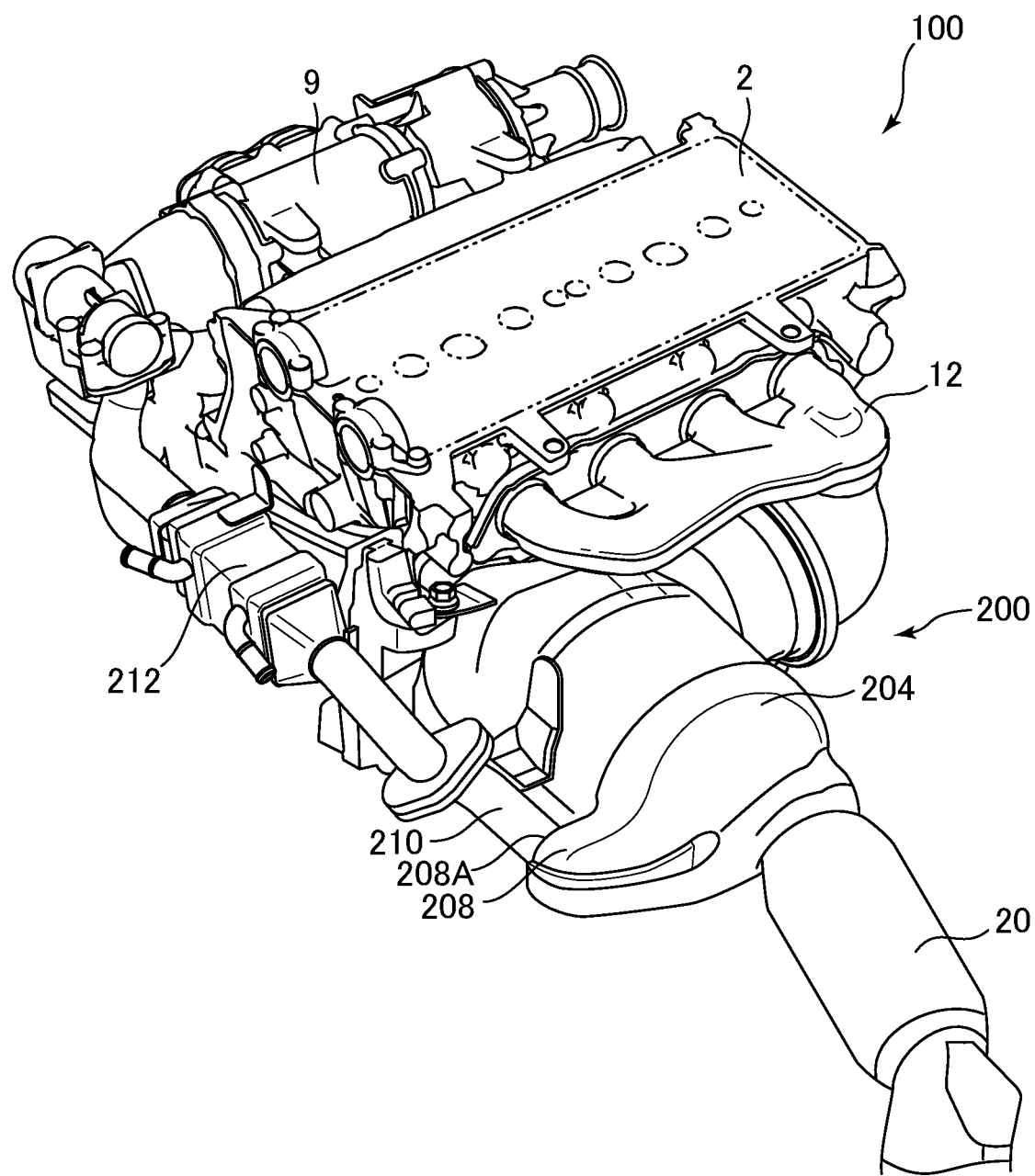
FIG. 11 is a perspective view of the exhaust system device for the vehicle according to the third embodiment of the present invention.

FIG. 8 is a plan view of an exhaust system device 200 of the vehicle 100 according to the third embodiment of the present invention, FIG. 9 is a bottom view of the exhaust system device 200 of the vehicle 100 according to the third embodiment of the present invention, FIG. 10 is a side view of the exhaust system device 200 of the vehicle 100 according to the third embodiment of the present invention, and FIG. 11 is a perspective view of the exhaust system device 200 of the vehicle 100 according to the third embodiment of the present invention.

As shown in these FIGS. 8 to 11, in the vehicle 100 according to the third embodiment, a brake unit 202 is fitted as the auxiliary machine to the dash panel 106. The brake unit 202 is fitted to the front surface of the upper dash panel 110 of the dash panel 106, and is located to the outside (right side) of the floor tunnel region 114 in the vehicle-width direction as viewed from the longitudinal direction of the vehicle. The brake unit 202 is thus located on the outside in the cylinder-array direction (on the outside, namely to the right side, in the vehicle-width direction) of the other-side end in the cylinder-array direction, namely the right-side end in the cylinder-array direction, of the exhaust manifold 12.

Further, as viewed from the longitudinal direction or the horizontal direction of the vehicle 100, the brake unit 202 is positioned such that the exhaust manifold 12 is disposed in a position at a height corresponding to the lower portion of the brake unit 202.

A radially projecting EGR leading part 208 is provided at the downstream end (rear end) of a downstream-side portion 206 of an exhaust purification device 204. An outlet (downstream end) 208A of the EGR leading part 208 is open to the front of the vehicle 100. An EGR pipe 210 is connected to the outlet 208A, and this EGR pipe 210 extends along the longitudinal direction of the vehicle 100 and has a downstream end connected to an EGR cooler 212. In the present embodiment, only one EGR cooler 212 is provided, and this EGR cooler 212 is fixed to the side surface of the cylinder block 4 of the engine 2. Further, the EGR cooler 212 has an upstream-side end connected to the EGR pipe 210 and a downstream-side end connected to the intake passage. In the present embodiment, the EGR gas passage is formed including the EGR pipe 210 and the EGR cooler 212.

The EGR pipe 210 and the EGR cooler 212 are disposed at positions overlapping the floor tunnel region 114 as viewed from the front of the vehicle 100. That is, in the present embodiment, the EGR gas passage is disposed at positions overlapping the floor tunnel region 114 as viewed from the front of the vehicle 100. The exhaust purification device 18, a part of the flexible pipe 20, the EGR gas leading part 208, and the EGR pipe 210 are also disposed at positions overlapping a region of the floor tunnel region 114 other than the tunnel extension region 116, as viewed from the front of the vehicle 100.

According to the third embodiment with such a configuration as above, it is possible to obtain effects as follows The dash panel 106 is fitted with the brake unit 202 as the auxiliary machine on the outside of the other-side end, namely the right-side end, in the cylinder-array direction, of the exhaust manifold 12 in the cylinder-alignment direction, therefore, even if the engine 2 and the exhaust manifold 12 move rearwardly at the time of collision of the vehicle, collision of the exhaust manifold 12 with the brake unit 202 can be avoided. It is thus possible to prevent damage caused by the exhaust manifold 12 to the other parts and to ensure the collision safety of the vehicle 100.

As viewed from the longitudinal direction of the vehicle 100, the exhaust manifold 12 is disposed at the height position corresponding to the lower portion of the brake unit 202. At the time of collision of the vehicle, if the exhaust manifold 12 moves not rearwardly but obliquely toward the side on which the brake unit 202 is disposed, the exhaust manifold 12 is less likely to interfere with the brake unit 202 since the space 117 is formed between the exhaust manifold 12 and dash panel 106 which are apart from each other at a predetermined distance. Further, even if the exhaust manifold 12 moves obliquely for more than a predetermined distance, the exhaust manifold 12 interferes with only the lower portion of the brake unit 202, which can minimize the damage to the brake unit 202 due to the collision.

The present invention is not limited to the above embodiments and may, for example, be in such a form as follows.

The longitudinal axial line of the first EGR cooler 24 or the EGR cooler 64 may be substantially parallel to the central axis of the downstream-side portion 34 of the exhaust purification device. For example, in the side view of the vehicle, the longitudinal axis of the EGR cooler and the central axis of the downstream-side end of the exhaust purification device may not necessarily match or be parallel to each other but may intersect with each other. In short, the longitudinal axis of the EGR cooler may be disposed along the longitudinal direction of the vehicle.

In the above embodiments, both the first EGR cooler 24 and the second EGR cooler 26 are of the water-cooling types, but this is not restrictive, and when two EGR coolers are provided in series, the upstream-side EGR cooler may be of an air-cooling type while the downstream-side EGR cooler may be of a water-cooling type. Employing the air-cooling type as the EGR cooler enables prevention of the increase in size of the EGR cooler as compared to the water-cooling type. Further, the EGR gas can be roughly cooled by the upstream-side air-cooling type EGR cooler and can then be reliably cooled down to a desired temperature by the downstream-side water-cooling type EGR cooler, thus enabling efficient cooling of the EGR gas.

Moreover, in the above embodiments, the cooling-water circuits of the first EGR cooler 24 and the second EGR cooler 26 are coupled in series, but this is not restrictive, and each of the first EGR cooler and the second EGR cooler may be provided on a different cooling-water circuit so as to have different cooling performance.

The auxiliary machine is the brake unit 202 in the above third embodiment, but the auxiliary machine is not limited thereto and may, for example, be an air conditioning unit, and a freely selected auxiliary machine for the vehicle can be employed.

The engine is not limited to the engine of the compression self-ignition type, and for example, an engine of a spark ignition type may be used.

LIST OF REFERENCE NUMERALS 1, 60 exhaust system device
2 engine
11 intake passage
18 exhaust purification device
22 EGR gas leading part
24 first EGR cooler
26 second EGR cooler
28 first EGR pipe
30 second EGR pipe 32 upstream-side portion
34 downstream-side portion
100 vehicle

The invention claimed is:

1. A vehicle engine comprising an exhaust system having an exhaust manifold and an exhaust purification device, the vehicle engine being placed horizontally such that a cylinder-array direction coincides with a vehicle-width direction, wherein
the exhaust manifold is disposed at a predetermined distance from a dash panel constituting a body of the vehicle,
the exhaust purification device is disposed in a position overlapping a floor tunnel region, formed by a floor tunnel of the body, and is disposed below the exhaust manifold and to one side of the center of the engine in the cylinder-array direction, as viewed from the longitudinal direction of the vehicle,
a connection passage connecting the exhaust manifold and the exhaust purification device is disposed on the other side of the center of the exhaust manifold in the cylinder-array direction, and extends below the exhaust manifold to be connected to the exhaust purification device,
a downstream-side portion of the exhaust purification device includes, at an end on the floor tunnel region, an exhaust gas recirculation (EGR) gas leading part for taking a part of an exhaust gas passing the exhaust purification device as an EGR gas,
the EGR gas leading part is disposed on an opposite side to the connection passage in the cylinder-array direction, and
an EGR gas passage connected to the downstream side of the EGR gas leading part is disposed lateral to the exhaust purification device on the opposite side to the connection passage in the cylinder-array direction.

2. The vehicle engine according to claim 1, wherein the dash panel is fitted with an auxiliary machine on the outside of the other-side end of the exhaust manifold in the cylinder-array direction as viewed from the longitudinal direction of the vehicle.

3. The vehicle engine according to claim 2, wherein the exhaust manifold is disposed in a position at a height corresponding to a lower portion of the auxiliary machine as viewed from the longitudinal direction of the vehicle.

4. The vehicle engine according to claim 2, wherein the auxiliary machine is a brake unit or an air conditioning unit.

5. The vehicle engine according to claim 1, wherein the downstream-side portion of the exhaust purification device extends in the longitudinal direction of the vehicle from below the exhaust manifold toward the floor tunnel.

6. The vehicle engine according to claim 5, wherein the EGR gas passage is disposed in a position overlapping the floor tunnel region as viewed from the longitudinal direction of the vehicle.

7. The vehicle engine according to claim 1, wherein the exhaust purification device is disposed in front of the dash panel in the longitudinal direction of the vehicle.

8. The vehicle engine according to claim 1, wherein the connection passage extends vertically below the exhaust manifold, a gas inlet of the connection passage is open upwardly and is coupled to the exhaust manifold, and a gas outlet of the connection passage is open in a direction substantially orthogonal to the gas inlet and is coupled to the exhaust purification device.

9. The vehicle engine according to claim 1, wherein an EGR cooler is disposed adjacent to a side surface of the exhaust purification device in the vehicle-width direction.

* * * * *